US012806595B2

(12) United States Patent
Seren et al.

(10) Patent No.: US 12,806,595 B2
(45) Date of Patent: Nov. 24, 2026

(54) METAMATERIAL-ENHANCED PHOTOCATALYTIC CONVERSION OF HYDROGEN SULFIDE

(71) Applicant: SAUDI ARABIAN OIL COMPANY, Dhahran (SA)

(72) Inventors: Huseyin R. Seren, Katy, TX (US); Ashok Santra, Houston, TX (US); Sampath K. Bommareddy, Sugar Land, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 811 days.

(21) Appl. No.: 18/347,494

(22) Filed: Jul. 5, 2023

(65) Prior Publication Data

US 2025/0010265 A1 Jan. 9, 2025

(51) Int. Cl.

*B01J 19/12* (2006.01)
*B01J 35/39* (2024.01)

(Continued)

(52) U.S. Cl.

CPC ............... *B01J 19/12* (2013.01); *B01J 35/39* (2024.01); *C01B 3/04* (2013.01); *C01B 17/0434* (2013.01)

(58) Field of Classification Search

CPC ........ B01J 19/12; B01J 35/39; B01J 19/0013; B01J 19/0053; B01J 19/123; B01J 19/127;

(Continued)

(56) References Cited

U.S. PATENT DOCUMENTS

| | | | | |
|---|---|---|---|---|
| 10,766,024 B2 | 9/2020 | Halas et al. | | |
| 2005/0215421 A1* | 9/2005 | Tohji | ........................ | B01J 27/04 502/340 |

(Continued)

FOREIGN PATENT DOCUMENTS

| | | |
|---|---|---|
| CN | 101590410 B | 11/2012 |
| TW | 201221219 A | 6/2012 |

(Continued)

OTHER PUBLICATIONS

Dan, M., Yu, S., Li, Y., Wei, S., Xiang, J., & Zhou, Y. (2020). Hydrogen sulfide conversion: how to capture hydrogen and sulfur by photocatalysis. Journal of Photochemistry and Photobiology C: Photochemistry Reviews, 42, 100339.

(Continued)

*Primary Examiner* — Xiuyu Tai

(74) *Attorney, Agent, or Firm* — Vorys, Sater, Seymour and Pease LLP

(57) ABSTRACT

Metamaterials may be utilized to facilitate conversion of hydrogen sulfide into elemental hydrogen and elemental sulfur in the presence of suitable photocatalyst particles. Photoreactor systems utilizing metamaterials may comprise a flow-through reaction space having at least one metamaterial-catalyst surface. The at least one metamaterial-catalyst surface comprises a metamaterial surface having a plurality of resonators patterned thereon and a plurality of photocatalyst particles located upon at least a portion of the resonators, within a gap between a first region and a second region of one or more resonators, or within a gap between adjacent resonators. The plurality of photocatalyst particles comprise at least one photocatalyst effective to convert hydrogen sulfide into elemental hydrogen and elemental sulfur upon exposure to electromagnetic radiation.

23 Claims, 12 Drawing Sheets

(51) Int. Cl.
*C01B 3/04* (2006.01)
*C01B 17/04* (2006.01)

(58) Field of Classification Search
CPC .............. B01J 19/128; B01J 2219/0877; B01J 2219/0892; C01B 3/04; C01B 17/0434; C01B 7/05; C01B 3/042; H01M 14/005; C10G 2/50; C10G 2300/70; C10G 2400/02; C10G 2400/04; C25B 1/55; C25B 11/04; C25B 11/042; C25B 11/049; C25B 11/051; C25B 11/087; Y02P 20/133; Y02E 60/36; G02B 5/003; G02B 1/002; E21B 43/34; C09K 8/532; C09K 2208/20; B01D 53/52; B01D 2259/804; B01D 2257/304; B01D 53/8612
See application file for complete search history.

(56) References Cited

U.S. PATENT DOCUMENTS

| | | | | |
|---|---|---|---|---|
| 2013/0065777 | A1 | 3/2013 | Altug et al. | |
| 2015/0064105 | A1* | 3/2015 | Takanabe | B01J 23/06 423/658.2 |
| 2016/0160364 | A1* | 6/2016 | Juluri | B01J 23/40 204/252 |
| 2016/0271589 | A1 | 9/2016 | Idriss et al. | |
| 2020/0023345 | A1 | 1/2020 | Wang et al. | |
| 2021/0146347 | A1 | 5/2021 | Page et al. | |
| 2023/0067758 | A1* | 3/2023 | Loh | G02B 5/003 |
| 2024/0060411 | A1* | 2/2024 | Sepulveda | E21B 43/34 |
| 2024/0216901 | A1* | 7/2024 | Khatiwada | B01J 35/39 |

FOREIGN PATENT DOCUMENTS

| | | | |
|---|---|---|---|
| WO | 2014169258 | A1 | 10/2014 |
| WO | 2015033306 | A1 | 3/2015 |
| WO | 2021127731 | A1 | 7/2021 |

OTHER PUBLICATIONS

Guijun Ma, Hongjian Yan, Xu Zong, Baojun Ma, Hongfu Jiang, Fuyu Wen, Can Li, Photocatalytic Splitting of H2S to Produce Hydrogen by Gas-Solid Phase Reaction, Chinese Journal of Catalysis, vol. 29, Issue 4, 2008, pp. 313-315.

Zhu, Shasha & Wang, Dunwei; Photocatalysis: Basic Principles, Diverse Forms of Implementations and Emerging Scientific Opportunities. Advanced Energy Materials. (2017).

Crossley, David et al. "The measurement of surface gravity." Reports on progress in physics. Physical Society (Great Britain) vol. 76,4 (2013): 046101.

Linan Zhou et al. ,Quantifying hot carrier and thermal contributions in plasmonic photocatalysis.Science 362,69-72 (2018).

Díaz, F.J.P., del Río, R.S., Rodriguez, P.E.D.S. (2022). Plasmonic Photocatalysts for Water Splitting. In: Kumar, P., Devi, P. (eds) Photoelectrochemical Hydrogen Generation. Materials Horizons: From Nature to Nanomaterials. Springer, Singapore.

Zhan C, Wang Qx, Yi J, Chen L, Wu Dy, Wang Y, Xie Zx, Moskovits M, Tian Zq. Plasmonic nanoreactors regulating selective oxidation by energetic electrons and nanoconfined thermal fields. Sci Adv. Mar. 5, 2021; 7(10).

Zhou, L., Martirez, J. M. P., Finzel, J., Zhang, C., Swearer, D. F., Tian, S., . . . & Halas, N. J. (2020). Light-driven methane dry reforming with single atomic site antenna-reactor plasmonic photocatalysts. Nature Energy, 5(1), 61-70.

Jain, P. K. (2019). Taking the Heat off of Plasmonic Chemistry. Journal of Physical Chemistry C, 123(40), 24347-24351.

Baffou, G., Bordacchini, I., Baldi, A. et al. Simple experimental procedures to distinguish photothermal from hot-carrier processes in plasmonics. Light Sci Appl 9, 108 (2020).

Zhan, Chao & Moskovits, Martin & Tian, Zhong-Qun. (2020). Recent Progress and Prospects in Plasmon-Mediated Chemical Reaction. Matter. 3. 42-56.

Li, Kun et al. "Balancing Near-Field Enhancement, Absorption, and Scattering for Effective Antenna-Reactor Plasmonic Photocatalysis." Nano letters vol. 17,6 (2017): 3710-3717.

Bagiante, S., Enderli, F., Fabiańska, J et al. Giant Electric Field Enhancement in Split Ring Resonators Featuring Nanometer-Sized Gaps. Sci Rep 5, 8051 (2015).

Nien, L. W., Lin, S. C., Chao, B. K., Chen, M. J., Li, J. H., & Hsueh, C. H. (2013). Giant electric field enhancement and localized surface plasmon resonance by optimizing contour bowtie nanoantennas. The Journal of Physical Chemistry C, 117(47), 25004-25011.

Fano, Ugo. "Effects of Configuration Interaction on Intensities and Phase Shifts." Physical Review 124 (1961): 1866-1878.

He, J., Fan, C., Wang, J., Ding, P., Cai, G., Cheng, Y., . . . & Liang, E. (2013). A giant localized field enhancement and high sensitivity in an asymmetric ring by exhibiting Fano resonance. Journal of Optics, 15(2), 025007.

Limonov, M. F., Rybin, M. V., Poddubny, A. N., & Kivshar, Y. S. (2017). Fano resonances in photonics. Nature Photonics, 11(9), 543-554.

Cheng, F., Yang, X., & Gao, J. (2014). Enhancing intensity and refractive index sensing capability with infrared plasmonic perfect absorbers. Optics letters, 39(11), 3185-3188.

Pendry, J. B., Martin-Moreno, L., & Garcia-Vidal, F. J. (2004). Mimicking surface plasmons with structured surfaces. science, 305(5685), 847-848.

Lee, S. H., Bantz, K. C., Lindquist, N. C., Oh, S. H., & Haynes, C. L. (2009). Self-assembled plasmonic nanohole arrays. Langmuir, 25(23), 13685-13693.

Lesuffleur, A., Im, H., Lindquist, N. C., & Oh, S. H. (2007). Periodic nanohole arrays with shape-enhanced plasmon resonance as real-time biosensors. Applied Physics Letters, 90(24), 243110.

Krasnok, A., Makarov, S., Petrov, M., Savelev, R., Belov, P., & Kivshar, Y. (2015, May). Towards all-dielectric metamaterials and nanophotonics. In Metamaterials X (vol. 9502, p. 950203). International Society for Optics and Photonics.

Yang, Y., Kravchenko, I. I., Briggs, D. P., & Valentine, J. (2014). All-dielectric metasurface analogue of electromagnetically induced transparency. Nature communications, 5(1), 1-7.

Vijayarengan, Preethi & Kanmani, S.; Photocatalytic hydrogen production. Materials Science in Semiconductor Processing (2013).

Portela et al., "Solar/lamp-irradiated tubular photoreactor for air treatment with transparent supported photocatalysts", Applied Catalysis B: Environmental, Jun. 1, 2011, pp. 95-102, vol. 105, No. 1-2. https://doi.org/10.1016/j.apcatb.2011.03.039.

Lou et al., "Direct H2S Decomposition by Plasmonic Photocatalysis: Efficient Remediation plus Sustainable Hydrogen Production", ACS Energy Letters, Sep. 30, 2022, pp. 3666-3674, vol. 7, No. 10. https://doi.org/10.1021/acsenergylett.2c01755.

Mascaretti et al., "Challenges and prospects of plasmonic metasurfaces for photothermal catalysis", Nanophotonics Journal, May 23, 2022, pp. 3035-3056, vol. 11, No. 13. https://doi.org/10.1515/nanoph-2022-0073.

International Search Report and Written opinion filed in corresponding PCT Application No. PCT/US2024/036267, dated Nov. 24, 2024, 25 pages.

* cited by examiner

METAMATERIAL-ENHANCED PHOTOCATALYTIC CONVERSION OF HYDROGEN SULFIDE

FIELD OF THE DISCLOSURE

The present disclosure relates generally to hydrogen sulfide processing and, more particularly, to methods and systems for converting hydrogen sulfide into elemental hydrogen and elemental sulfur.

BACKGROUND OF THE DISCLOSURE

Acid gases such as hydrogen sulfide ($H_2S$) and carbon dioxide ($CO_2$), for example, are often present in combination with hydrocarbon gases produced from a subterranean formation. Natural gas is but one example of a hydrocarbon gas that may contain acid gases.

To make hydrocarbon gases suitable for further use, acid gases may be removed using amine-based absorbents. Eventually, the amine-based absorbents are processed to discharge the acid gases therefrom and regenerate the free amine. Carbon dioxide liberated from the amine-based absorbents may be released into the atmosphere, although carbon capture strategies are becoming increasingly common and oftentimes are mandated by local regulations. Hydrogen sulfide, in contrast, is a highly toxic gas, and is not usually released into the atmosphere without first being converted into a more benign form.

At present, hydrogen sulfide is most frequently processed by the Claus process, which converts the hydrogen sulfide into elemental sulfur and water through partial oxidation and a subsequent catalytic reaction of the remaining hydrogen sulfide with sulfur dioxide. High temperatures are utilized in the Claus process, and rigorous process control is usually required to avoid excessive oxidation.

An alternative reaction pathway for processing hydrogen sulfide to form elemental hydrogen as a more valuable product would be highly desirable, as hydrogen is an environmentally benign, clean energy storage resource or fuel. Although some progress has been made in the conversion of hydrogen sulfide into elemental hydrogen and elemental sulfur through methane reforming, thermal conversion, plasma decomposition, or electrochemical decomposition, current technologies are rather energy intensive and occur at high temperatures with only low conversion to products. In addition, accumulation of elemental sulfur upon reaction surfaces may be problematic in some instances, such as upon electrodes in electrochemical processes, thereby compromising the conversion process. Photochemical conversion of hydrogen sulfide into elemental hydrogen and elemental sulfur has also been explored, but the conversion efficiency remains rather poor.

In view of the foregoing, improved processes for converting hydrogen sulfide into elemental hydrogen and elemental sulfur would be highly desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to some embodiments consistent with the present disclosure, photoreactor systems comprise: a flow-through reaction space having at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators; wherein the plurality of photocatalyst particles comprise at least one photocatalyst effective to convert hydrogen sulfide into elemental hydrogen and elemental sulfur upon exposure to electromagnetic radiation.

In other embodiments consistent with the present disclosure, methods for processing hydrogen sulfide comprise: providing a gas stream comprising hydrogen sulfide; interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators; wherein the plurality of photocatalyst particles comprise at least one photocatalyst effective to convert hydrogen sulfide into elemental hydrogen and elemental sulfur upon exposure to electromagnetic radiation; exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface.

In still other embodiments, methods of the present disclosure comprise: providing a feed stream comprising hydrogen sulfide; interacting the feed stream in a flow-through reaction space with at least one metamaterial surface comprising a plurality of resonators patterned thereon; exposing the at least one metamaterial surface to a plurality of photocatalyst particles while interacting the feed stream with the at least one metamaterial surface; wherein the plurality of photocatalyst particles comprise at least one photocatalyst effective to convert hydrogen sulfide into elemental hydrogen and elemental sulfur upon exposure to electromagnetic radiation; exposing the at least one metamaterial surface to electromagnetic radiation while interacting the at least one metamaterial surface with the feed stream; and obtaining elemental hydrogen and elemental sulfur after interacting the feed stream with the at least one metamaterial surface.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
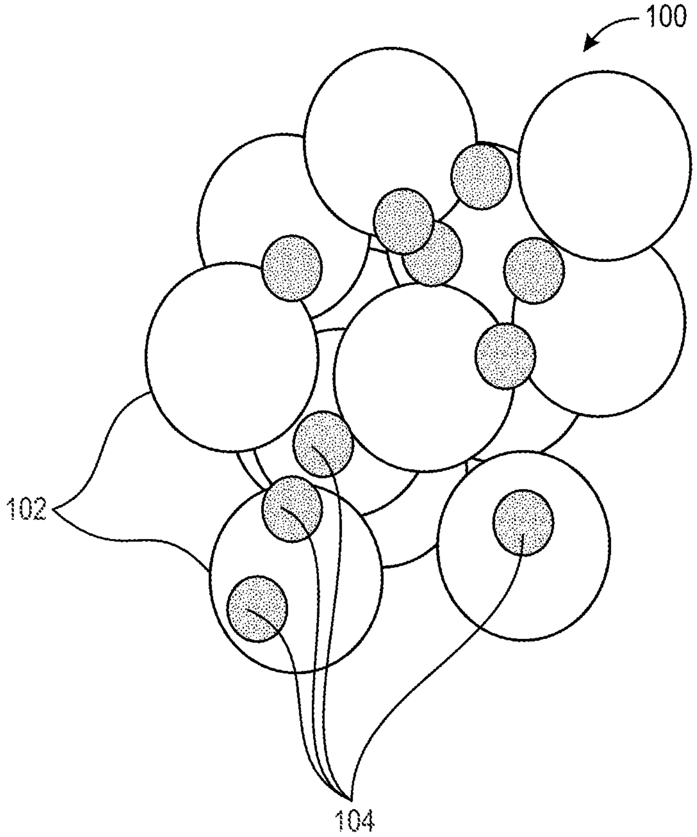
FIG. 1 is a diagram of an illustrative metamaterial-catalyst surface.

Embodiments in accordance with the present disclosure generally relate to hydrogen sulfide processing and, more particularly, to methods and systems for converting hydrogen sulfide into elemental hydrogen and elemental sulfur.

As discussed above, direct formation of elemental hydrogen from hydrogen sulfide would be a highly desirable pathway for processing this highly toxic gas into a more benign form, which is also a valuable clean energy resource. Unfortunately, efficient conversion of hydrogen sulfide into elemental hydrogen has not yet been realized. Elemental sulfur co-produced in such processes may also be problematic in some cases.

Photocatalysis is another approach that has been explored to promote conversion of hydrogen sulfide into elemental hydrogen and elemental sulfur. One advantage of photocatalytic processes, in general, is that they may often be conducted at lower temperatures than are other types of catalytic or non-catalytic chemical processes. In addition, photocatalytic processes use electromagnetic radiation as a "reactant," sunlight in some cases, and are environmentally friendly as a result.

Unfortunately, efficient photocatalytic conversion of hydrogen sulfide into elemental hydrogen and elemental sulfur has not yet been realized. Photocatalysts capable of converting hydrogen sulfide into elemental hydrogen and elemental sulfur are usually semiconductors, and electromagnetic radiation may promote a catalytic reaction therewith if the electromagnetic radiation has a wavelength producing an energy sufficient to exceed the semiconductor bandgap, thereby creating an electron-hole pair upon the surface of the photocatalyst. Upon generation of an electron-hole pair, electrons reduce protons of $H_2S$ into elemental hydrogen, and electron holes oxidize sulfide of $H_2S$ into elemental sulfur. Though photocatalysis has many desirable features, the conversion efficiency is usually rather low due to electron-hole recombination and poor electromagnetic radiation absorption (low quantum yield). Moreover, the band gaps of most semiconductor photocatalysts are rather large and reside in the ultraviolet range. The need for ultraviolet electromagnetic radiation may further complicate the photocatalytic conversion process, since less than 3% of solar radiation is in the ultraviolet range, and artificial sources of ultraviolet electromagnetic radiation are often not very energy efficient.

As used herein, the term "elemental hydrogen" refers to a diatomic hydrogen molecule ($H_2$).

As used herein, the term "elemental sulfur" refers to any allotrope consisting of zero-valent sulfur atoms. Preferably, elemental sulfur refers to a ring of zero-valent sulfur atoms. More preferably, elemental sulfur refers to $S_8$.

In response to the foregoing, the present disclosure provides enhanced photocatalytic methods and systems for converting hydrogen sulfide into elemental hydrogen and elemental sulfur. In particular, the photocatalytic processes and systems of the present disclosure utilize conventional semiconductor photocatalysts in combination with a metamaterial to increase the efficiency of the photocatalytic conversion process. At the very least, by placing a metamaterial in close proximity to photocatalyst particles, electromagnetic radiation harvested by the metamaterial may be efficiently transferred to the photocatalyst particles by various mechanisms such as, for example, heat generation, direct electron transfer, or direct excitation of valence band electrons to the conduction band as a consequence of large localized electrical fields. Without being bound by theory or mechanism, the metamaterial may function as a resonator in accomplishing the foregoing. The resonator may be a plasmonic resonator or a Mie resonator. Metals may exhibit plasmonic resonance, whereas dielectric materials exhibit Mie resonance. In accomplishing the foregoing, the metamaterial may, in some cases, also alter the wavelength of electromagnetic radiation that may suitably promote the photocatalytic reaction into the visible or infrared region of the electromagnetic spectrum. In so altering the wavelength of electromagnetic radiation that may promote the photocatalytic reaction, solar radiation may become more feasible for use and/or artificial electromagnetic radiation sources operating more efficiently in alternative spectral regions may be used. Various resonator configurations suitable for producing a metamaterial that may enhance photocatalyst performance are described in further detail herein.

As used herein, the term "metamaterial" refers to a composite material where at least one of the components of the composite material is patterned with a feature size smaller than the wavelength(s) of electromagnetic radiation incident thereon, such that the electromagnetic radiation interacts differently with the metamaterial than with the corresponding unpatterned components. The patterned component may be placed inside or on the surface of another component. At least two components of the metamaterial have dissimilar complex dielectric functions (or refractive indices), such as silicon nitride, air and gold; water and silver; silicon and air; polyimide, copper, and water, and the like. The patterned component defining the metamaterial may be arranged in a regular or irregular repeating pattern, wherein the repeating pattern is at a smaller dimension than the wavelength of electromagnetic radiation incident thereupon. In non-limiting examples, metamaterials may exhibit a negative index of refraction and/or demonstrate perfect absorption or near-perfect absorption. By altering the size and orientation of the repeating pattern within a metamaterial, the resulting optical properties may be altered to change the absorption and/or transmission of electromagnetic radiation in a desired way. In the present disclosure, the repeating pattern of a metamaterial may be altered to promote interaction with photocatalyst particles to facilitate conversion of hydrogen sulfide into elemental hydrogen and elemental sulfur, as discussed in brief above.

The material that is patterned to form the resonators defining a metamaterial may comprise a dielectric material, a metallic conductor (metal), a semiconductor, or any combination thereof to provide a desired response to incident electromagnetic radiation. The interaction between the incident electromagnetic radiation and the metamaterial may differ depending on the specific material(s) used and how the material(s) are patterned to define the metamaterial. The interaction between the incident electromagnetic radiation and the components in a metamaterial may depend upon the complex dielectric function of the metamaterial and the wavelength of the incident electromagnetic radiation. Example types of interactions may include excitation of conduction band electrons, plasmon generation, spoof plasmon induction, or dielectric polarization. Metamaterials may enhance electric and magnetic fields in a localized area that is much smaller than the wavelength of the incident electromagnetic radiation, thereby acting like a magnifier to concentrate energy from the incident electromagnetic radiation received upon a large surface to a smaller focal region. Unlike optical magnifiers, metamaterials may focus electromagnetic radiation onto a region smaller than the wavelength of the incident electromagnetic radiation. This property may be leveraged to facilitate energy transfer from the metamaterial onto photocatalyst particles in order to promote a photocatalytic reaction of hydrogen sulfide according to the disclosure herein.

Accordingly, methods and reactor systems of the present disclosure may utilize at least one metamaterial-catalyst surface, which comprises a metamaterial surface having a plurality of resonators patterned thereon and a plurality of photocatalyst particles located upon at least a portion of the resonators, within a junction between a first region and a second region of one or more resonators, or within a junction between adjacent resonators. The metamaterial surface may comprise the resonators in a fixed and patterned orientation upon a substrate (i.e., supported). The photocatalyst particles may be located upon the resonators or within gaps associated therewith, so that efficient activation of the photocatalyst may occur upon interacting electromagnetic radiation with the metamaterial surface. The plurality of photocatalyst particles comprises at least one photocatalyst effective to convert hydrogen sulfide into elemental hydrogen and elemental sulfur upon exposure to electromagnetic radiation. In some cases, the photocatalyst particles may be carried within a feed stream containing hydrogen sulfide, such that a metamaterial-catalyst surface is formed in situ. Additional details in regard to the foregoing are provided hereinafter.

Figure 2:
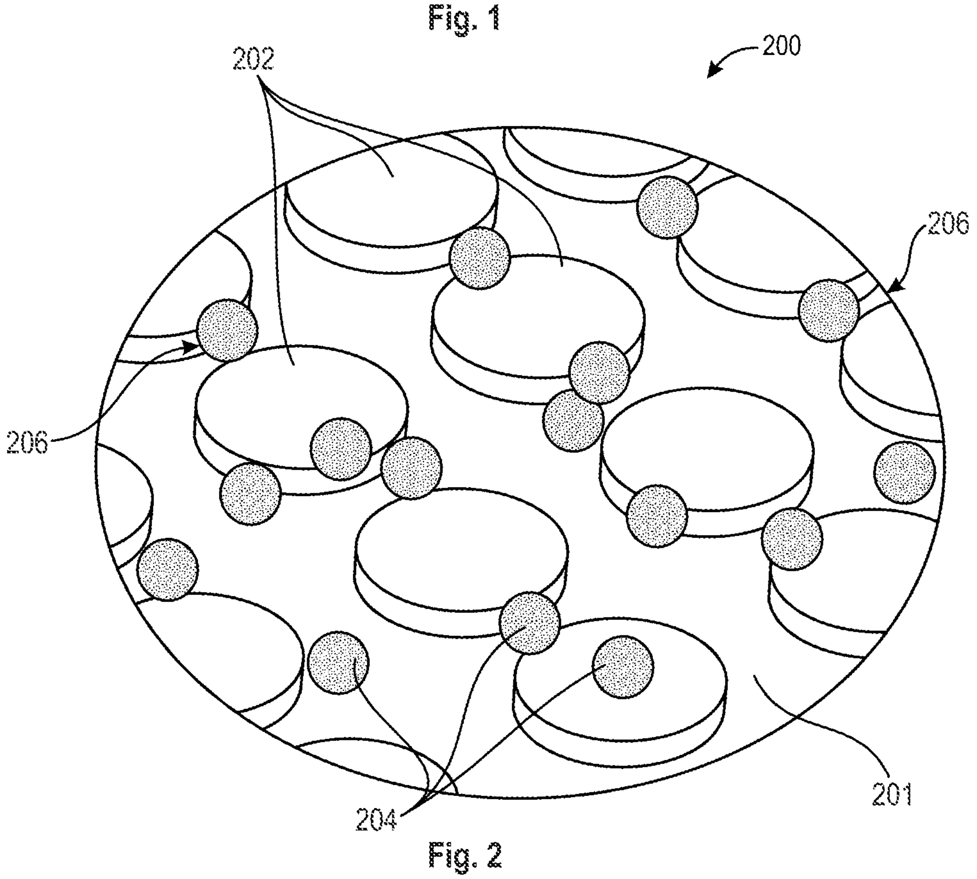
FIG. 2 is a diagram of an illustrative metamaterial-catalyst surface, in which the metamaterial constructs are localized upon a substrate.

FIG. 1 is a diagram of illustrative metamaterial-catalyst surface 100, in which metamaterial constructs 102 have photocatalyst particles 104 located upon metamaterial constructs 102 or in gaps between adjacent metamaterial constructs 102. FIG. 2 is a diagram of illustrative metamaterial-catalyst surface 200, in which metamaterial constructs 202 are localized upon substrate 201 and photocatalyst particles 204 are located upon metamaterial constructs 202 or within gaps 1616 between adjacent metamaterial constructs 202. Preferably, resonators are disposed within metamaterial constructs 202 upon substrate 201 in an ordered array, as depicted in FIG. 2. Although FIG. 2 has depicted substrate 201 in a substantially planar configuration, it is to be appreciated that non-planar substrate configurations are also possible, as described in further detail below.

Various configurations for metamaterial-catalyst surfaces may be used in the present disclosure to promote photocatalyst activation, such as through enhancing the electric field in proximity to the photocatalyst particles. As discussed hereinafter, a range of resonator configurations may be suitable for patterning within a metamaterial and for promoting photocatalyst activation through generation of large electric fields, or through the various alternative activation pathways discussed above. FIGS. 3-11 are diagrams of various configurations for resonators (plasmonic resonators or Mie resonators, for example) that may be suitable for use in the present disclosure when patterned within a metamaterial. It is to be appreciated that alternative resonator configurations suitable for use in the present disclosure may be envisioned by one having ordinary skill in the art.

Metal, semiconductor, or dielectric films used to define any of the resonators disclosed herein may have a thickness ranging from about 10 nm to about 10 μm. Any of the resonators disclosed herein may have dimensions ranging from about 10 nm to about 10 μm. When arranged in a pattern upon a substrate, the resonators may have a periodicity (spacing) of about 100 nm to about 100 μm. The arrangement of the resonators upon a substrate may have any defined periodicity such as, for example, square lattice, hexagonal lattice, or even asymmetric distributions.

Figure 3:
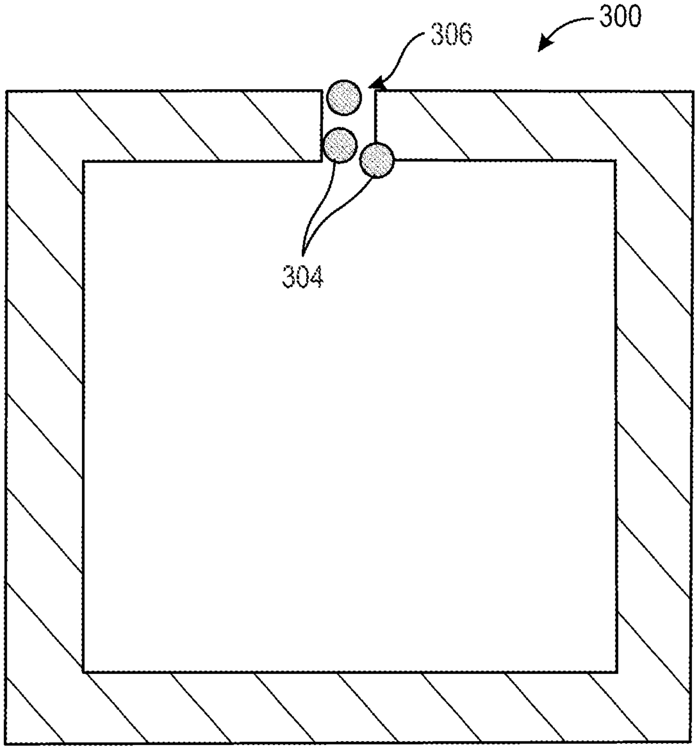
FIGS. 3-11 are diagrams of various configurations for resonators that may be suitable for use in the present disclosure when patterned within a metamaterial.
Figure 4:
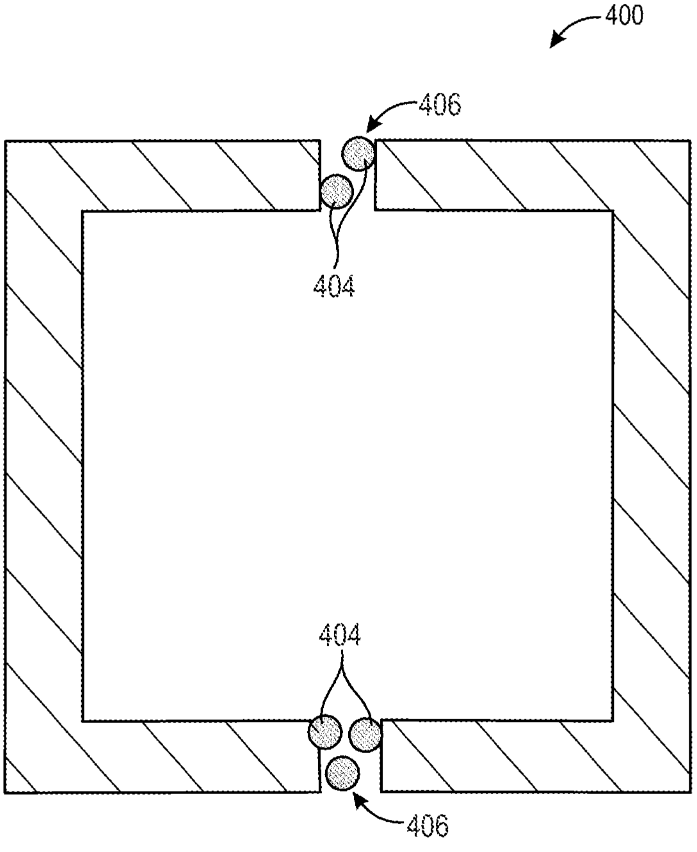
Figure 5:
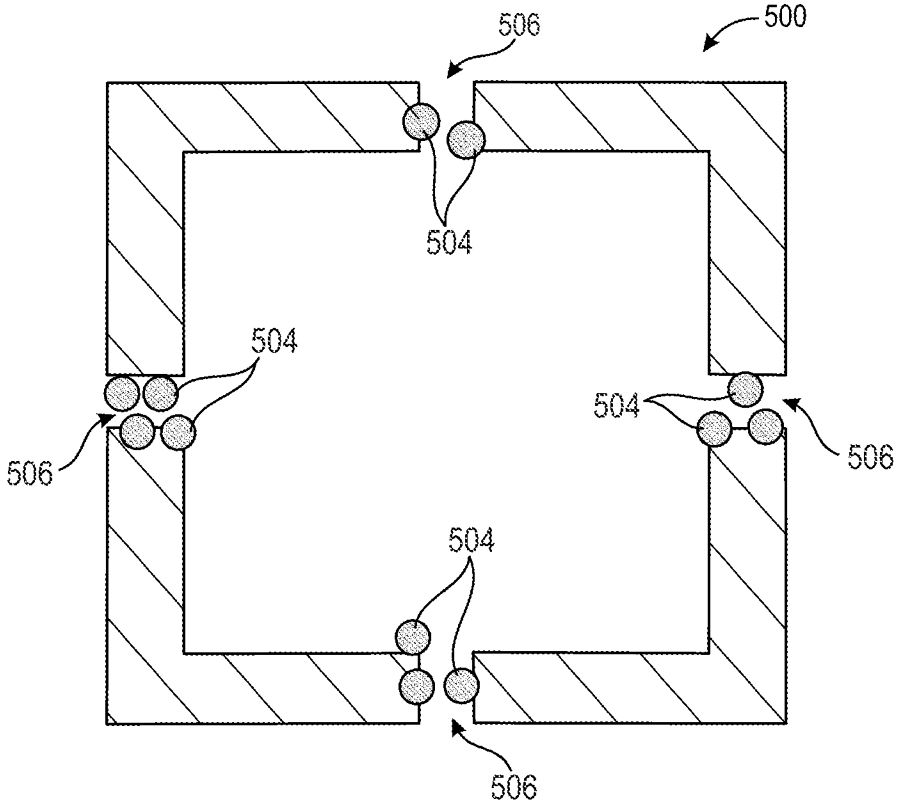

FIGS. 3-5 are diagrams of illustrative split-ring resonators 300, 400, and 500 having photocatalyst particles 304, 404, and 504 localized within gap(s) 306, 406, and 506, respectively. Split-ring resonators, such as split-ring resonators 300, 400, and 500, may be understood as an RLC circuit where inductance and resistance arise from the loop geometry, and capacitance arises from gap(s) 306, 406, and 506. When incident electromagnetic radiation is polarized parallel to gap(s) 306, 406, and 506, a loop current is induced. When the frequency of the incident electromagnetic radiation matches the resonant frequency of the split-ring resonator, enhanced electric fields within gap(s) 306, 406, and 506 can be achieved. The enhancement factor is proportional to the quality factor of the resonator and inversely proportional to the size of gap(s) 306, 406, and 506, as will be understood by one having ordinary skill in the art. Split-ring resonators 300 and 400 are polarized by virtue of their geometries; hence, the electric field component of the incident electromagnetic radiation may be aligned with gaps 306 and 406 to excite a resonance mode that results in field enhancement. Split-ring resonator 500, in contrast, is polarization-insensitive due to gaps 506 being disposed (symmetrically) in both directions in the x-y plane. The resonant frequency depends on the sizes of the ring and gap(s) 306, 406, and 506, as well as the permittivity of the substrate and medium in proximity to gap(s) 306, 406, and 506. Accordingly, the resonant frequency is tunable and adjusted to the wavelength at which the activity of photocatalyst particles 304, 404, and 504 is the highest. The size of gap(s) 306, 406, and 506 may typically range from about $\lambda/20$ to about $\lambda/2$, where $\lambda$ is the wavelength of the incident electromagnetic radiation in air. Therefore, in the case of visible light, the size of gap(s) 306, 406, and 506 may range from about 20 nm to about 350 nm. Optionally, a protective layer (not shown) may be formed over the ring structure, depending on the environment to which it is to be exposed (e.g., corrosive species, temperature, and pH). The protective layer may comprise, for example, silicon dioxide, silicon nitride, paralyene, or the like. In non-limiting examples, the ring structure may be formed from a metal (e.g., aluminum, gold, silver, copper, or the like), a quasi-metal (e.g., graphene), or a non-metal with high refractive index (e.g., silicon, tellurium, germanium, gallium arsenide, gallium phosphide, titanium dioxide, diamond, or the like).

Figure 6:
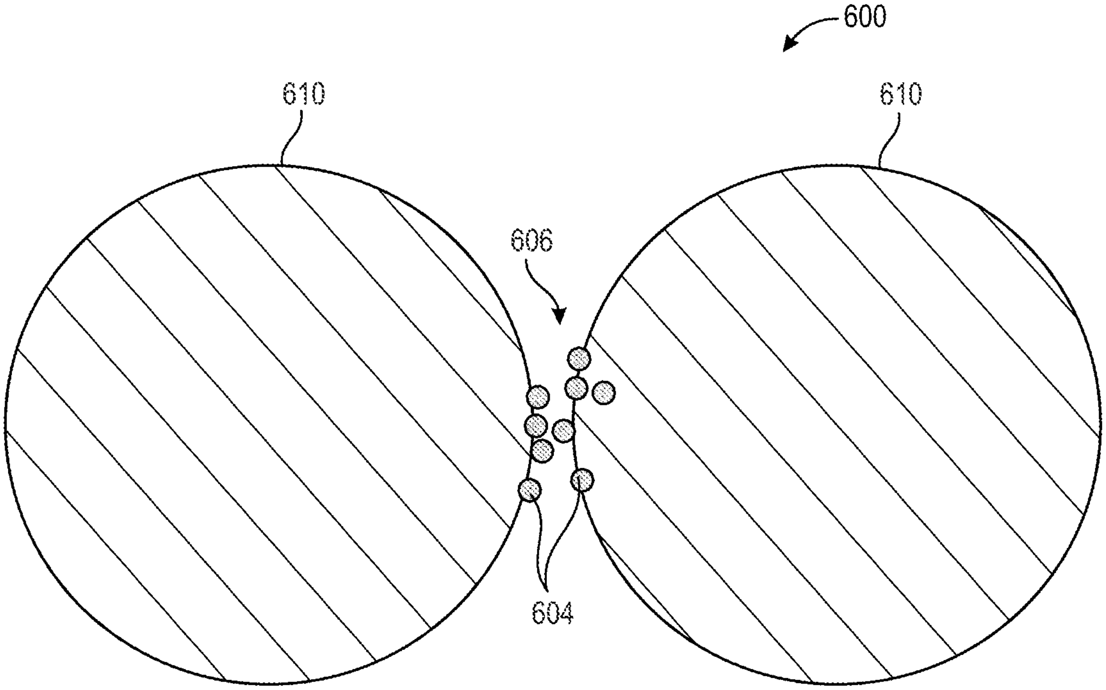
Figure 7:
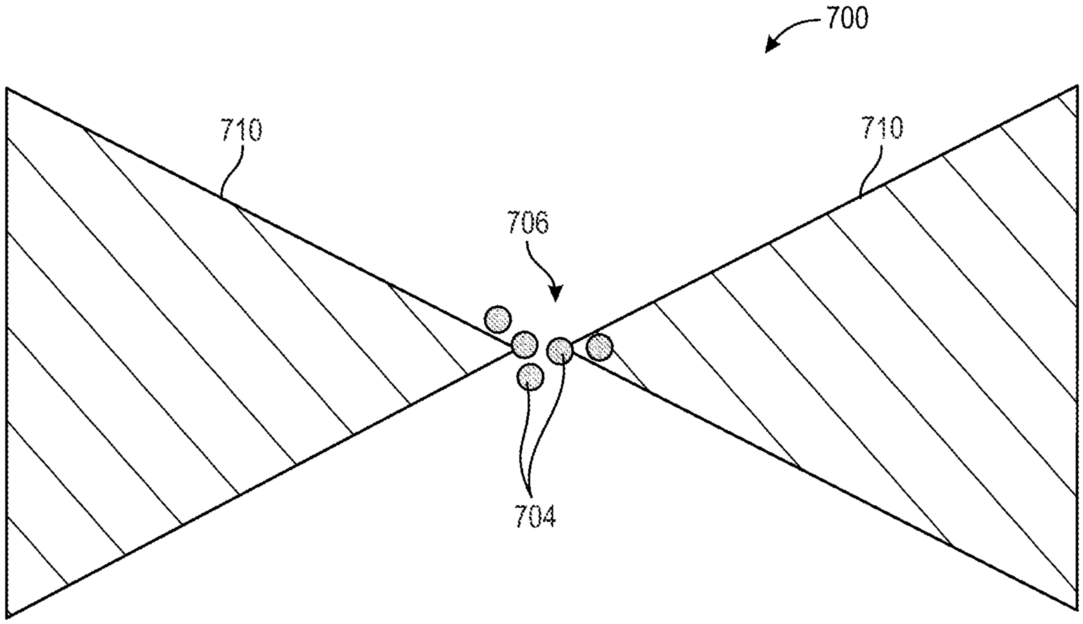
Figure 8:
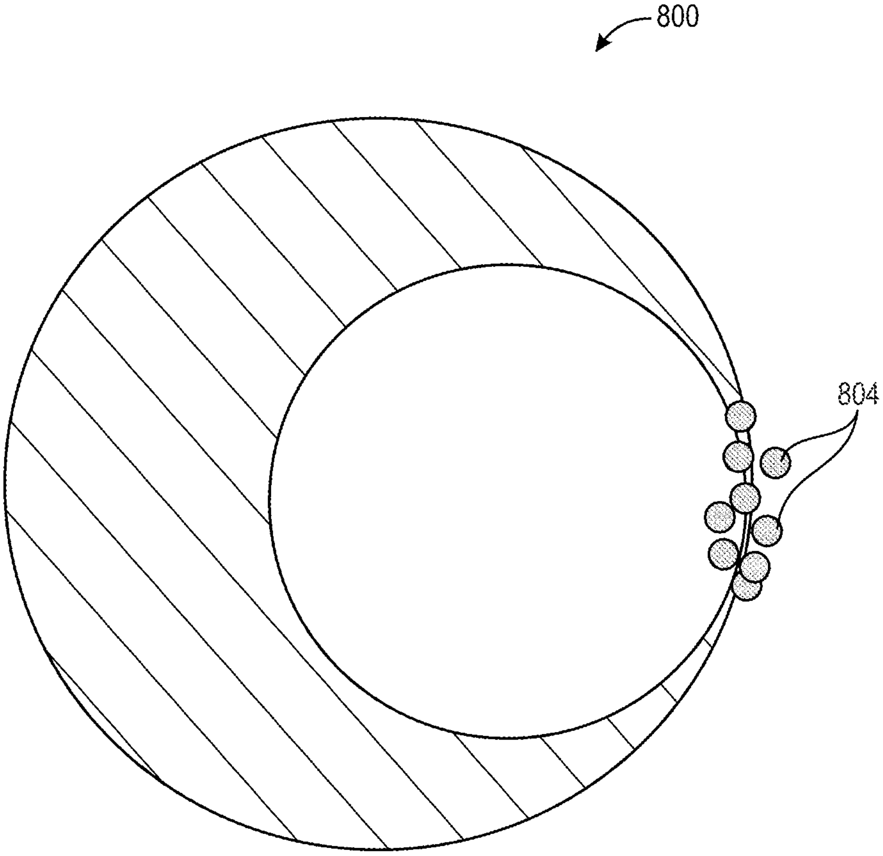
Figure 9:
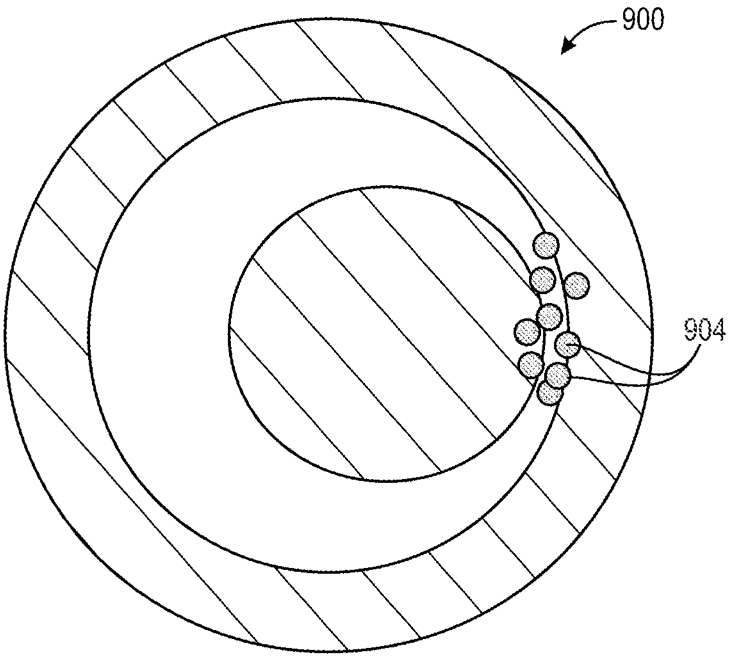
Figure 10:
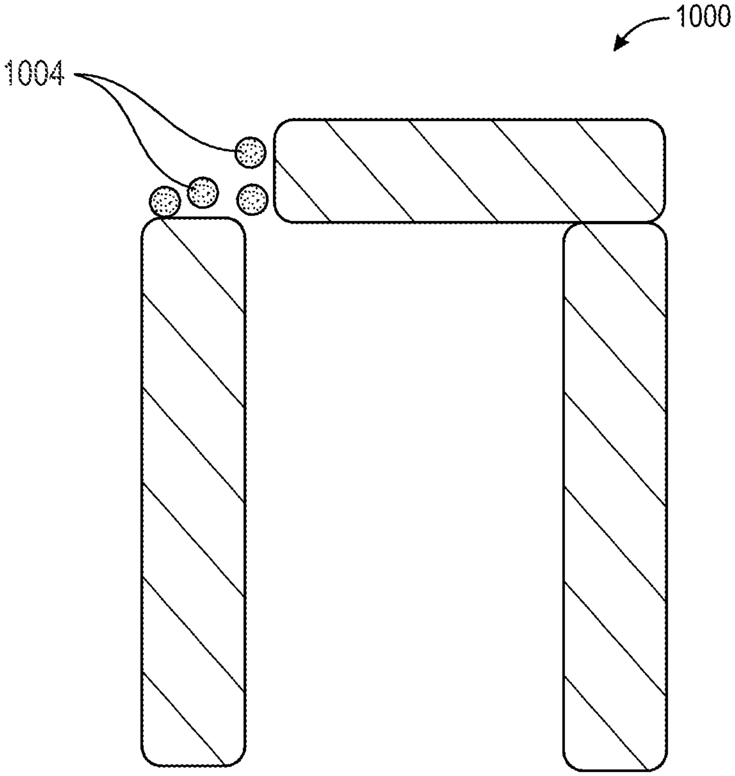

FIGS. 6 and 7 are diagrams of illustrative dimeric resonators 600 and 700 having photocatalyst particles 604 and 704 localized within gap 606 and 706, respectively. Gap 606 in dimeric resonator 600 is located where disks 610 approach each other in a near-tangential fashion. Gap 706 in dimeric resonator 700 is located where vertices of geometric shapes 710 approach each other in a near-contact. Although geometric shapes 710 are shown as triangles in FIG. 7, it is to be appreciated that other geometric shapes, such as squares or rectangles, for example, may be appropriate in some instances. Dimeric resonators, such as dimeric resonators 600 and 700, are pairs of dipole antennas that are placed in close proximity with only a small gap (e.g., smaller than the length of the resonator) in between. A large field enhancement may be realized when a dimeric resonator is excited with an electromagnetic field parallel to gap 606 or 706 and whose frequency matches the resonant frequency. Optionally, a protective layer (not shown) may be formed over the dimeric resonator, depending on the environment to which it is to be exposed (e.g., corrosive species, temperature, and pH). The protective layer may comprise, for example, silicon dioxide, silicon nitride, paralyene, or the like. In non-limiting examples, the ring structure may be formed from a metal (e.g., aluminum, gold, silver, copper, or the like), a quasi-metal (e.g., graphene), or a non-metal with high refractive index (e.g., silicon, tellurium, germanium, gallium arsenide, gallium phosphide, titanium dioxide, diamond, or the like).

Figure 11:
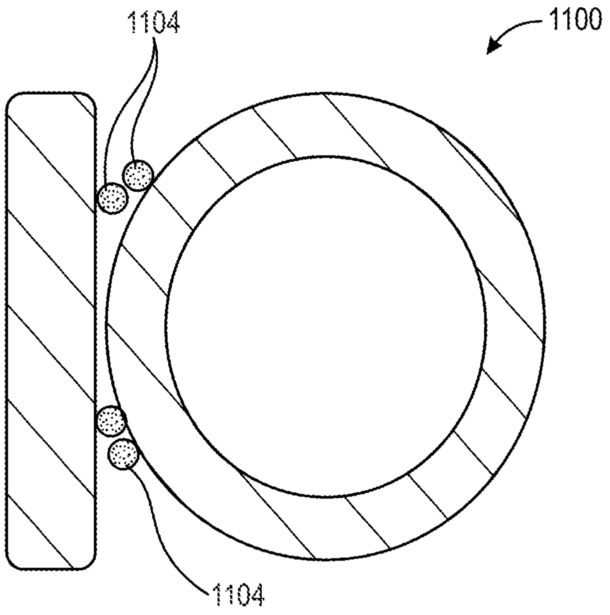

FIGS. 8-11 are diagrams of illustrative resonators 800, 900, 1000, and 1100 exhibiting Fano resonance and having photocatalyst particles 804, 904, 1004, and 1104 associated therewith, respectively. Non-radiative resonance modes, also referred to as dark modes or sub-radiative modes, have minimal radiative losses and exhibit high quality factor resonances or narrow spectral lines. High quality factors provide large field enhancements, but since no radiation occurs when a resonance mode is non-radiative, the resonance mode cannot be excited directly with radiating electromagnetic radiation. To circumvent this issue, radiating electromagnetic radiation may be coupled to a radiative mode, also referred to as a bright mode or super-radiative mode, and the radiative mode, in turn, may be coupled to a dark mode via near-field interactions. When a radiative resonance mode is coupled with a non-radiative resonance mode, a sharp, asymmetric frequency response results, which is referred to as Fano resonance. Various resonators are capable of exhibiting Fano resonance. Examples include asymmetric ring resonators (FIG. 8), asymmetric disk-in-ring resonators (FIG. 9), asymmetric pi resonators (FIG. 10), and rod-adjacent-to-ring resonators (FIG. 11). Resonators 900, 1000, and 1100, for example, contain photocatalyst particles 904, 1004, or 1104, respectively, within a gap between a first region and a second region thereof. Optionally, a protective layer (not shown) may be formed over the resulting Fano resonator, depending on the environment to which it is to be exposed (e.g., corrosive species, temperature, and pH). The protective layer may comprise, for example, silicon dioxide, silicon nitride, paralyene, or the like. In non-limiting examples, the ring structure may be formed from a metal (e.g., aluminum, gold, silver, copper, or the like), a quasi-metal (e.g., graphene), or a non-metal with high refractive index (e.g., silicon, tellurium, germanium, gallium arsenide, gallium phosphide, titanium dioxide, diamond, or the like).

Any of resonators 300, 400, 500, 600, 700, 800, 900, 1000, or 1100 may be patterned upon a substrate and treated with photocatalyst particles to afford a metamaterial-catalyst surface. The resulting metamaterial-catalyst surface may define at least a portion of a flow-through reaction space for promoting photocatalytic conversion of hydrogen sulfide into elemental hydrogen and elemental sulfur, as discussed in further detail below. The substrate may be substantially planar or substantially non-planar. As another option, any of resonators 300, 400, 500, 600, 700, 800, 900, 1000, or 1100 may be disposed upon a substrate, but without photocatalyst particles 304, 404, 504, 604, 704, 804, 904, 1004, or 1104 being present, in which case resonators 300, 400, 500, 600, 700, 800, 900, 1000, or 1100 may aid in harvesting electromagnetic radiation as heat energy, for instance. The heat energy, in turn, may aid in promoting activation of photocatalyst particles remote from resonators 300, 400, 500, 600, 700, 800, 900, 1000, or 1100, as also discussed in further detail below (see FIGS. 12A and 12B, for example).

Additional types of metamaterial-catalyst surfaces are also possible, some forms of which may be readily configured to facilitate fluid (liquid or gas) flow therethrough. Any of the additional types of metamaterial-catalyst surfaces that follow hereinafter may also define at least a portion of a flow-through reaction space for promoting photocatalytic conversion of hydrogen sulfide into elemental hydrogen and elemental sulfur.

Figure 12A:
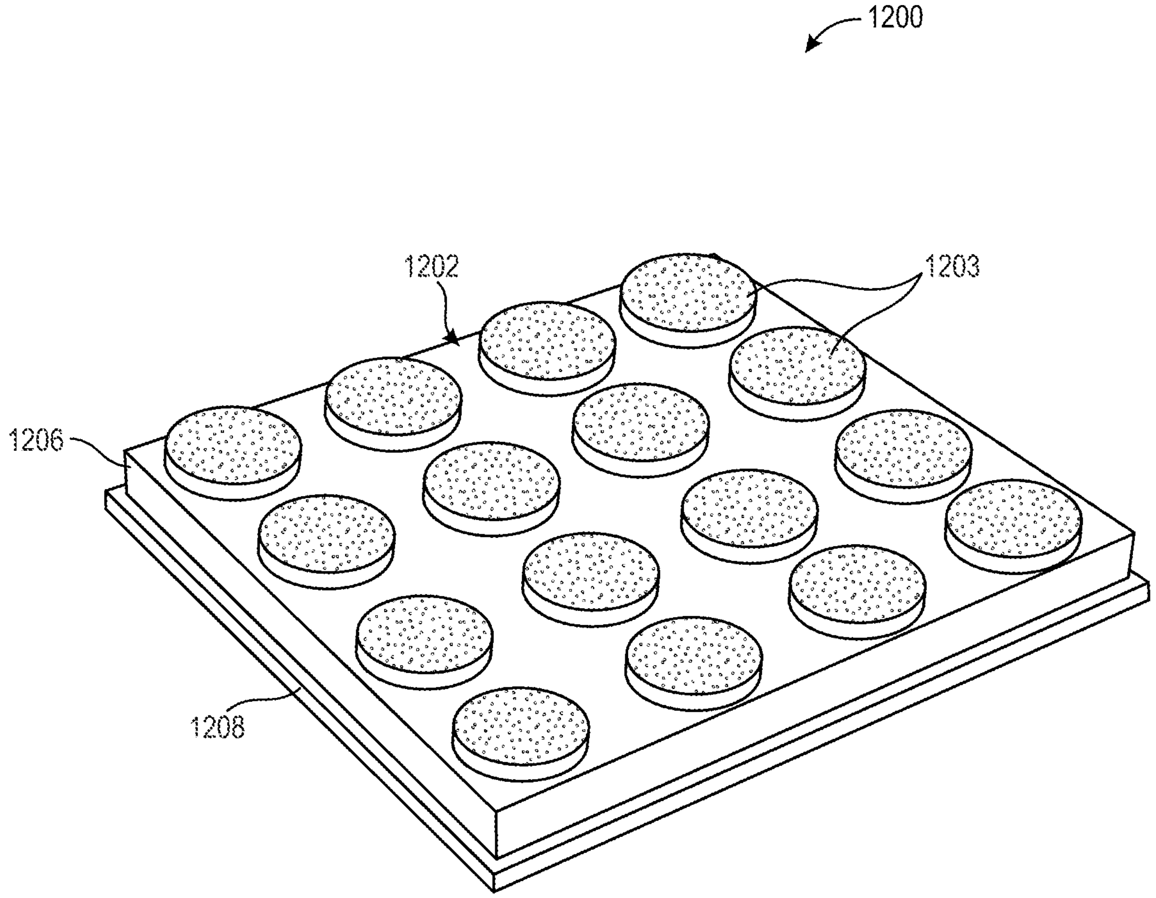
FIG. 12A is a perspective view diagram of an illustrative metal-insulator-metal (MIM) resonator.
Figure 12B:
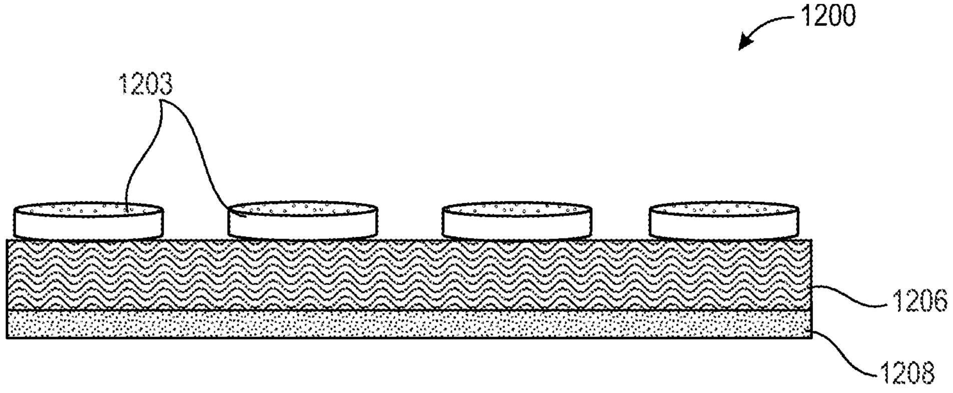
FIG. 12B is a corresponding cross-sectional side-view diagram of the illustrative MIM resonator.

FIG. 12A is a perspective view diagram of illustrative metal-insulator-metal (MIM) resonator 1200, and FIG. 12B is a corresponding cross-sectional side-view diagram. MIM resonator 1200 includes patterned metal layer 1202. Although patterned metal layer 1202 is shown as arrayed disks 1203 in FIGS. 12A and 12B, it is to be appreciated that other shapes or arrangements of metal patterning may similarly afford a comparable type of resonator. Patterned metal layer 1202 is disposed upon dielectric layer 1206, and dielectric layer 1206, in turn, is disposed upon metal backing layer 1208. Incoming electromagnetic radiation is absorbed by the metamaterial within arrayed disks 1203 and converted into heat energy through losses within patterned metal layer 1202 and dielectric layer 1206. High field enhancements are usually achieved within dielectric layer 1206. Dielectric layer 1206 may have a thickness less than the free-space wavelength and preferably less than the quarter free-space wavelength. The incident energy from the electromagnetic radiation is transferred to the photocatalyst particles in the form of heat or an electric field. Because of the high degree of absorption that may be realized, MIM resonators similar to MIM resonator 1200 are sometimes referred to as perfect absorbers or near-perfect absorbers.

In the disclosure herein, the enhanced fields within dielectric layer 1206 may be leveraged to promote activation of photocatalyst particles therein (photocatalyst particles not shown in FIGS. 12A and 12B). The heat energy generated by absorption of electromagnetic radiation, as described above, may also at least partially transfer to the photocatalyst particles to promote activation thereof. By making dielectric layer 1206 sufficiently porous or by defining a plurality of flow channels therein (e.g., microfluidic flow channels), fluid flow may take place through dielectric layer 1206, either as a liquid stream or a gas stream. Photocatalyst particles and promoters may be immobilized within dielectric layer 1206 to define a composite, or photocatalyst particles and promoters may be co-flowed through dielectric layer with a fluid passing through the porosity or flow channels (e.g., a stream comprising hydrogen sulfide, either as a liquid stream or a gas stream). Promoters may increase the efficiency of the photocatalyst particles for conducting a photochemical reaction. Suitable promoters will be familiar to one having ordinary skill in the art.

Arrayed holes or slits may also define a resonator and produce a resonant response when exposed to electromagnetic radiation. Resonator nano-hole (or nano-slit) arrays etched from thin metal films and having aperture sizes smaller than the wavelength of incident electromagnetic radiation may output (transmit) electromagnetic radiation with high efficiency at specific wavelengths, typically at a wavelength different than that of the incident electromagnetic radiation. Large field enhancements may be achieved within the holes or slits. When associated with photocatalyst particles in or near the apertures, such arrayed holes or slits may similarly define a metamaterial-catalyst surface suitable for use in the disclosure herein. The arrayed holes or slits may extend only partially through a substrate defining the metamaterial-catalyst surface or completely through the substrate. When extending fully through the substrate, the metamaterial-catalyst surface may define a membrane structure.

By extending the holes or slits in a resonator nano-hole (or nano-slit) array through a substrate upon which the metal layer resides, a structure results through which fluid may flow. The structure may be a nano-hole (or nano-slit) array resonator membrane. By placing photocatalyst particles within the holes or slits, typically near the surface where exposure to electromagnetic radiation is more feasible, photocatalyst activation may take place by way of the field enhancements therein, thereby facilitating conversion of hydrogen sulfide in a fluid (liquid or gas) passing therethrough. The resonant frequency of the resonator may be adjusted for a preferred wavelength of incident electromagnetic radiation by altering the hole (or slit) size and/or the periodicity or patterning. In addition, the dielectric functions of both the metal and/or the dielectric materials may be further selected to facilitate additional tailoring of the resonant frequency.

Figure 13:
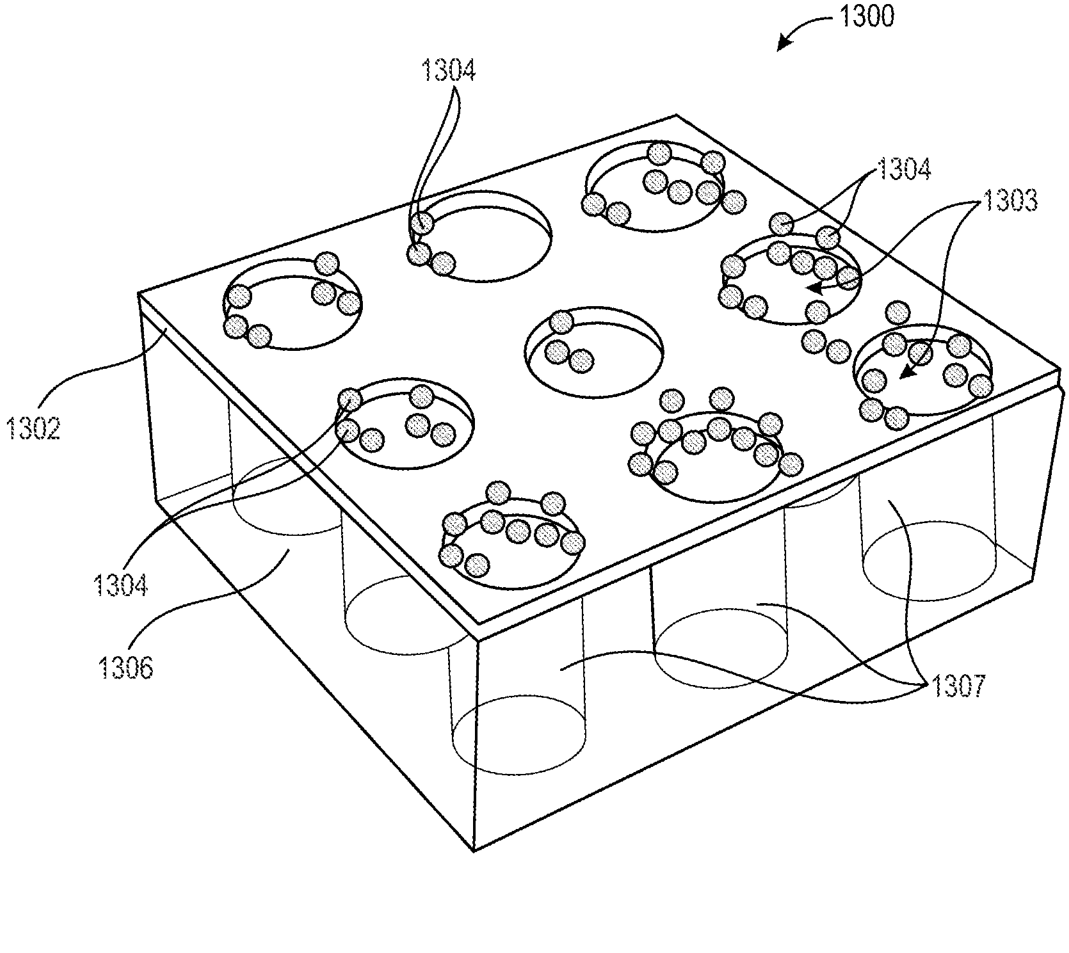
FIG. 13 is a diagram of nano-hole (or nano-slit) array membrane resonator.

FIG. 13 is a diagram of nano-hole (or nano-slit) array membrane resonator 1300. As shown, nano-hole (or nano-slit) array membrane resonator 1300 includes holes (or slits) 1303 arrayed in metal layer 1302. Holes (or slits) 1303 extend through metal layer 1302 and substrate 1306 to define flow channels 1307, such that a fluid passing therethrough exits on the face of substrate 1306 opposite that of metal layer 1302. Substrate 1306 is typically a dielectric material. As shown in FIG. 13, photocatalyst particles 1304 and promoters are disposed near the entry of holes (or slits) 1303, wherein photocatalyst particles 1304 may be readily activated by incident electromagnetic radiation with the further aid of the large field enhancement in holes (or slits) 1303. As an alternative, unsupported photocatalyst particles may be co-flowed with a fluid passing through flow channels 1307 and undergo activation in a similar manner.

Any of the foregoing types of metamaterial-catalyst surfaces may be constructed using a metal to fabricate at least a portion of the resonator(s). Alternately, at least some of the resonator(s) or a portion thereof may be fabricated using a dielectric material, such as silicon, to promote activation of photocatalyst particles by Mie resonance. For example, Fano resonators and perfect absorbers (after substituting metal for a suitable dielectric material) may be fabricated in an all-dielectric fashion. Mie resonances can be excited in dielectric particles through dielectric polarization. Metamaterials fabricated from all-dielectric materials may have several advantages over those fabricated at least in part from metals. Namely, with all-dielectric metamaterials, energy is not lost to resistivity, corrosion may be less problematic, and fabrication and material costs may be significantly lower. The dielectric material defining an all-dielectric resonator is usually a high refractive index material. As a non-limiting example, silicon, tellurium, germanium, gallium arsenide, gallium phosphide, titanium dioxide, or diamond may be used to fabricate all-dielectric resonator metamaterials absorbing in the infrared and visible regions of the electromagnetic spectrum.

Figure 14:
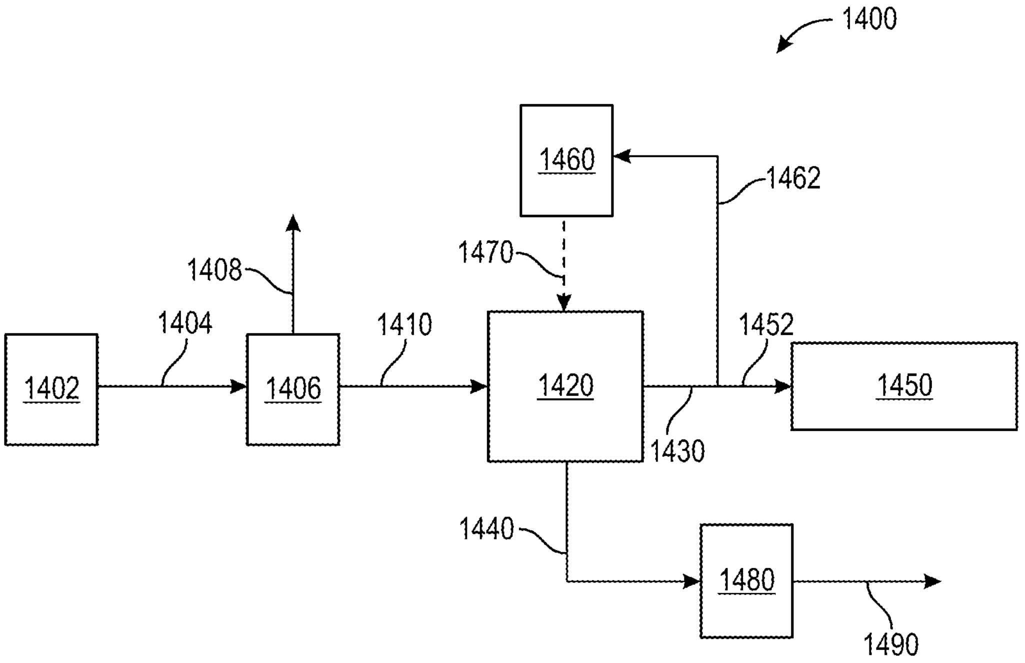
FIG. 14 is a block diagram of an illustrative photoreactor system, in which photocatalytic conversion of hydrogen sulfide into elemental hydrogen and elemental sulfur may take place according to the disclosure herein.

One or more of the foregoing resonator architectures may be utilized to promote photocatalytic conversion of hydrogen sulfide into elemental hydrogen and elemental sulfur. FIG. 14 is a block diagram of illustrative photoreactor system 1400, in which photocatalytic conversion of hydrogen sulfide into elemental hydrogen and elemental sulfur may take place according to the disclosure herein. Although the following description of photoreactor system 1400 is primarily directed to a flow-through reactor system, it is to be appreciated that a similar photoconversion of hydrogen sulfide into elemental hydrogen and elemental sulfur may take place under metamaterial promotion in a static or batchwise manner through routine modification thereof. It is further to be appreciated that reaction of hydrogen sulfide may take place in a suitable liquid phase, rather than within a gas stream, through routine modification of photoreactor system 1400, as discussed in brief below.

As shown in FIG. 14, gas source 1402 provides gas stream 1404, which is laden with hydrogen sulfide. In non-limiting examples, gas source 1402 may comprise a wellbore extending into a subterranean formation. The wellbore may produce primarily liquid hydrocarbons, gaseous hydrocarbons, or a mixture thereof. Therefore, in some examples, gas stream 1404 may comprise natural gas received from a wellbore and laden with hydrogen sulfide. Other acid gases, such as carbon dioxide, may also be present in gas stream 1404. Gas stream 1404 is received in gas processing facility 1406, wherein treatment with an amine absorbent takes place to remove hydrogen sulfide and other acid gases from gas stream 1404. After acid gas absorption takes place, processed gas stream 1408 (e.g., a sweetened natural gas stream) is discharged from gas processing facility 1406, typically as an overhead stream.

Hydrogen sulfide may be absorbed to the amine absorbent through an acid-base reaction. The hydrogen sulfide may be liberated (stripped) from the amine absorbent in gas processing facility 1406 after separation of the hydrogen sulfide from gas stream 1404 to discharge hydrogen sulfide-rich gas stream 1410. The amine absorbent may be recycled (details not shown). Hydrogen sulfide-rich gas stream 1410 is then provided to photoreactor 1420 to convert the hydrogen sulfide into elemental hydrogen 1430, which exits photoreactor 1420 as a gas stream, and elemental sulfur 1440, which exits photoreactor 1420 as a liquid stream, as further discussed herein. Photoreactor 1420 may operate in either a batchwise or flow-through (continuous) manner, but preferably, hydrogen sulfide-rich gas stream 1410 is processed in a flow-through manner.

Although the foregoing description of photoreactor system 1400 indicates that hydrogen sulfide is discharged from gas processing facility 1406 as a gas stream, it is to be appreciated hydrogen sulfide may also be discharged in a liquid stream, such as an aqueous stream comprising an amine salt of hydrogen sulfide. The liquid stream comprising hydrogen sulfide may similarly be provided to photoreactor 1420 for processing into elemental hydrogen 1430 and elemental sulfur 1440 according to the disclosure herein. When processing a liquid stream, resonators may be associated with a material having a complex permittivity (or dielectric constant different than air), which may shift the resonant frequency toward smaller frequency values. That is, different components for the resonators may be selected depending on whether a gas stream or a liquid stream is being processed.

With continued reference to FIG. 14, elemental hydrogen 1430 is discharged from photoreactor 1420 as a gas stream. A first portion of elemental hydrogen 1430 may then be conveyed to storage location 1450 (e.g., a tank, railcar, or similar storage facility) via line 1452, and/or a second portion of elemental hydrogen 1430 may be conveyed to power generation facility 1460 via line 1462. It is to be appreciated that the first portion and/or the second portion of elemental hydrogen 1430 may undergo further processing (e.g., compression and/or expansion, heating and/or cooling, further purification, and/or the like) prior to being provided to storage location 1450 and/or power generation facility 1460. Power generation facility 1460 may supply the electrical power generated therein to an electrical grid, backup storage for an electrical grid in a suitable storage medium (e.g., a battery farm, or like facility capable of storing large quantities of generated electrical power), or a local facility for direct (non-grid) use. Optionally, at least a portion of electrical power 1470 produced in power generation facility 1460 may be supplied to photoreactor 1420 to satisfy at least a portion of the operational power requirements thereof. It is to be appreciated that other components of photoreactor system 1400 may likewise be supplied with electrical power 1470, which is produced at least in part from elemental hydrogen 1430.

Again with continued reference to FIG. 14, elemental sulfur 1440 is discharged from photoreactor 1420 as a liquid stream, which may be at any temperature above the melting point of sulfur (112.8° C. or 235° F.). Preferably, the liquid stream containing elemental sulfur 1440 is maintained at a temperature of about 135° C. to about 155° C. (275° F.-311° F.), which represents a range of suitable operating temperatures for photoreactor 1420. By operating photoreactor 1420 in the foregoing temperature range above the melting point of elemental sulfur, a safety margin is provided to preclude surface fouling and/or plugging of lines and equipment with sulfur solids while still remaining low enough to facilitate ready cooling. In addition, by maintaining elemental sulfur 1440 as a liquid stream, removal of elemental sulfur 1440 from photoreactor 1420 may take place more readily than removing sulfur solids. Furthermore, the flow-through nature of photoreactor 1420 may additionally encourage removal of elemental sulfur 1440 therefrom.

Once elemental sulfur 1440 has been removed from photoreactor 1420, the liquid stream comprising elemental sulfur 1440 is introduced to condensing chamber 1480 for cooling and solidification. In non-limiting examples, solidification may be promoted by cooling water introduced to condensing chamber 1480, such as cooling water circulating within one or more cooling lines in thermal contact with molten sulfur in condensing chamber 1480. After solidification has taken place, sulfur solids 1490 may be recovered. Sulfur solids 1490 may be discarded or preferably sold as a commodity chemical for further uses thereof.

Accordingly, the present disclosure provides photoreactor systems incorporating at least one metamaterial-catalyst surface and capable of operating in a flow-through manner. The photoreactor systems may comprise a flow-through reaction space having at least one metamaterial-catalyst surface. The at least one metamaterial-catalyst surface may comprise a metamaterial surface having a plurality of resonators patterned thereon and a plurality of photocatalyst particles located upon at least a portion of the resonators, within a gap between a first region and a second region of one or more resonators, or within a gap between adjacent resonators. The plurality of photocatalyst particles comprise at least one photocatalyst effective to convert hydrogen sulfide into elemental hydrogen and elemental sulfur upon exposure to electromagnetic radiation. More specific description of suitable photoreactors having a flow-through reaction space follows below.

The at least one metamaterial-catalyst surface may incorporate one or more of the resonator configurations discussed hereinabove. The resonators defining the metamaterial surface may be formed from one or more suitable materials including dielectric materials, metals, semiconductors, or any combination thereof. Suitable dielectric materials may include, but are not limited to, silicon dioxide, silicon nitride, the like, or any combination thereof. Suitable metals may include, but are not limited to, aluminum, gold, silver, copper, or the like. Suitable semiconductors may include, but are not limited to, silicon, doped silicon, silicon carbide, gallium arsenide, the like, or any combination thereof.

Arrangement of the resonators upon the metamaterial surface may be altered to change the manner in which the metamaterial surface interacts with incident electromagnetic radiation, as discussed in brief above. Patterning of the resonators upon the metamaterial surface may be conducted by standard photolithography and etching techniques, for example. One having ordinary skill in the art will be familiar with suitable techniques producing resonators upon a surface, as well as for manipulating the properties of a metamaterial, and more detailed description thereof is not provided herein in the interest of brevity. It is to be appreciated that the specific resonator patterning, specific resonator type(s), resonator material(s), and combinations thereof are not particularly limited in the disclosure herein and may be altered in view of application-specific considerations, including but not limited to the specific type of photocatalyst particles employed and how activation thereof with electromagnetic radiation is to be carried out.

In non-limiting examples, the photocatalyst particles present upon the at least one metamaterial-catalyst surface may comprise a semiconductor, such as an oxide or sulfide semiconductor, optionally containing a metal supported thereon. Suitable oxide or sulfide semiconductors may include, for example, titanium oxide, zinc oxide, cadmium sulfide, zinc sulfide, copper-zinc sulfide, and zinc indium sulfide ($ZnIn_2S_4$). Metals that may optionally be supported on the oxide or sulfide semiconductor may include, but are not limited to, copper, zinc, indium, ruthenium, rhodium, palladium, platinum, iridium, and gold. More specific examples of oxide or sulfide semiconductors that may be present in the photocatalyst particles suitable for use herein include, for example, Ag on Cd/Zns, CdS, $ZnS—In_2S_3—CuS$, $ZnIn_2S_4$, $Cd_{0.5}Zn_{0.5}S$, $MoS_2$-graphene/$ZnIn_2S_4$, P-doped CdS, $Mn_xCd_{1-x}S$, $Zn_xCd_{1-x}S$, VS, $RuO_2$/$Pb_2Ga_2Nb_2O_{10}$, $NiO_x$/$FeGaO_3$, $ZnBiGaO_4$, $CdIn_2S_4$, quantum dot CdS/glass powder, $CdLa_2S_4$, $CdIn_2S_4$, nanoparticle $TiO_2$, quantum dot bismuth/glass nanocomposites, 6,13-pentacenequinone, $Bi_2S_3$, nanoparticle $TiO_2$/graphene, $Ag_3PO_4$, $MnS/In_2S_3$, $In_2S_3/CuS$, $Cd_xIn_{1-x}S$, $MnS/(In_xCu_{1-x})_2S$, $MnS/In_2S_3/PdS$, $MnS/In_2S_3/MoS_2$, CdS/Pt. $ZnBiVO_4$, $CdS/TiO_2$, and combinations thereof. If not already so-modified, any of the foregoing may be further decorated with a metal, blended with a dopant.

Particle sizes for the photocatalyst particles may range from about 1 nm to about 100 nm, or about 25 nm to about 100 nm, or about 100 nm to about 1000 nm. It is to be appreciated that the particle size may be adjusted depending upon the size of the resonator or gap upon which or within which the photocatalyst particles are to be disposed.

The flow-through reaction space in the photoreactors disclosed herein may be configured for reacting hydrogen sulfide in a gas phase or in a liquid phase. Preferably, the flow-through reaction space may be configured for reacting hydrogen sulfide in a gas-phase, such as within a gas stream received from a gas source, such as a wellbore, or a gas processing facility. Therefore, in some embodiments, the flow-through reaction space may be connected to a gas inlet for receiving a gas stream comprising hydrogen sulfide, a gas outlet for discharging elemental hydrogen, and a liquid outlet for discharging elemental sulfur.

The at least one metamaterial-catalyst surface in the flow-through reaction space may receive electromagnetic radiation from one or more sources. For example, the at least one metamaterial-catalyst surface may receive electromagnetic radiation from a solar source, an artificial source, or any combination thereof. Suitable artificial sources may emit visible or infrared electromagnetic radiation over one or more wavelengths within these spectral regions. Example artificial sources may include, but are not limited to, one or more incandescent light bulbs, one or more light-emitting diodes, one or more lasers, the like, or any combination thereof. In more specific examples, the at least one metamaterial-catalyst surface in the flow-through reaction space may receive electromagnetic radiation from at least an artificial source, preferably wherein the artificial source is located within or adjacent to the flow-through reaction space. In non-limiting examples, the artificial source may comprise a light-emitting diode (LED) array, suitable examples of which will be familiar to one having ordinary skill in the art. Preferably, the at least one metamaterial-catalyst surface in the flow-through reaction space may receive electromagnetic radiation from both an artificial source (e.g., a LED array) and a solar source (i.e., the sun). Alternately, electromagnetic radiation received from a solar source may be converted to heat energy, which may further facilitate a photocatalytic reaction promoted by the photocatalyst particles and the at least one metamaterial.

More specific configurations of flow-through reaction spaces incorporating at least one metamaterial-catalyst surface, an artificial source of electromagnetic radiation, and provision for receiving electromagnetic radiation from a solar source are described hereinafter in reference to FIGS. 15-20. Although not shown in FIGS. 15-20, it is to be appreciated that a suitable drain for removing elemental sulfur in a liquid state may also be present.

Figure 15:
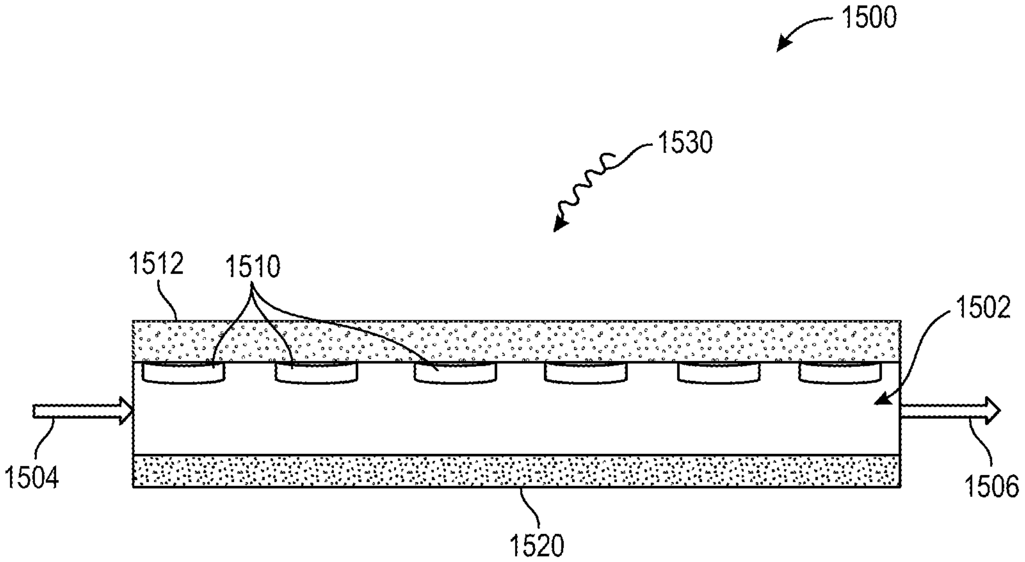
FIG. 15 is a cross-sectional diagram of an illustrative photoreactor system containing a flow-through reaction space configured to receive solar radiation through a transparent substrate and interact with resonators therein.

FIG. 15 is a cross-sectional diagram of illustrative photoreactor system 1500 containing a flow-through reaction space configured to receive solar radiation through a transparent substrate. As shown, photoreactor system 1500 includes flow-through reaction space 1502, which is connected to gas inlet 1504 and gas outlet 1506. Resonators 1510 are located upon substrate 1512 to define a metamaterial upon a boundary of flow-through reaction space 1502. Light-emitting diode array 1520 is located opposite resonators 1510 and defines another boundary of flow-through reaction space 1502.

In photoreactor system 1500, substrate 1512 is at least partially transparent to solar radiation 1530, such that resonators 1510 may interact with electromagnetic radiation received from both a solar source and light-emitting diode array 1520 to promote a photocatalytic conversion of hydrogen sulfide. This feature may facilitate more energy-efficient operation than in conventional processes using only artificial sources. Moreover, by using both solar radiation 1530 and light-emitting diode array 1520, process continuity may be realized when the sun is not shining or the solar intensity is low. Moreover, because light-emitting diode array 1520 may be powered, at least in part, with electricity generated from elemental hydrogen produced according to the disclosure herein (e.g., see FIG. 14), the overall conversion process for converting hydrogen sulfide into elemental hydrogen and elemental sulfur may be rather efficient and environmentally friendly.

Accordingly, in some embodiments, the at least one metamaterial-catalyst surface may be present upon a substrate that is at least partially transparent to solar radiation, such that the at least one metamaterial-catalyst surface receives a first input of electromagnetic radiation as solar radiation from a first face of the substrate and a second input of electromagnetic radiation from the artificial source.

Figure 16:
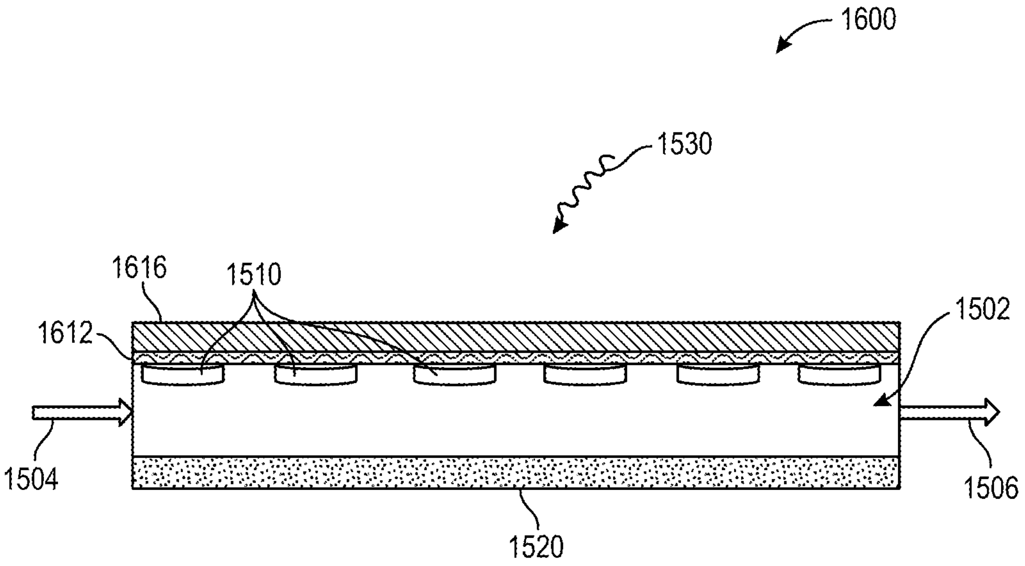
FIG. 16 is a cross-sectional diagram of an illustrative photoreactor system containing a flow-through reaction space configured to receive heat from solar radiation that is blocked from reaching resonators therein.

FIG. 16 is a cross-sectional diagram of illustrative photoreactor system 1600 containing a flow-through reaction space configured to receive heat from solar radiation that is blocked from reaching resonators 1510. Photoreactor system 1600 is similar to photoreactor system 1500, except for modifications discussed hereinafter, and common reference characters will be used to designate features of photoreactor system 1600 having a similar structure and function to corresponding structures in photoreactor system 1500. In photoreactor system 1600, substrate 1512 is replaced by substrate 1612, upon which resonators 1510 are again disposed. Unlike substrate 1512, substrate 1612 is opaque to solar radiation or is blocked from receiving solar radiation 1530 by solar heat absorber 1616, which is disposed upon the face of substrate 1612 opposite the face upon which resonators 1510 are disposed. For example, solar heat absorber 1616 may be a black-painted metal plate or a similar type of highly absorbing structure. Although resonators 1510 are blocked from receiving solar radiation 1530 in photoreactor system 1600, the solar radiation absorbed by solar heat absorber 1616 and/or substrate 1612 may be converted to heat, such that the heat is at least partially transferred to flow-through reaction space 1502.

In an alternative configuration that may achieve a similar result, resonators 1510 may be located directly upon the interior face of solar heat absorber 1616 (facing toward flow-through reaction space 1502), in which case substrate 1612 may be omitted. In either case, the heat transferred to flow-through-reaction space 1502, in combination with electromagnetic radiation provided by light-emitting diode array 1520, may promote a photocatalytic conversion of hydrogen sulfide in accordance with the disclosure herein.

In another alternative configuration of photoreactor system 1600, resonators 1510 and substrate 1612 may be replaced with a metal-insulator-metal resonator. The metal-insulator-metal resonator may be similar to metal-insulator-metal resonator 1200 (FIGS. 12A and 12B) and may be better understood by reference thereto. Resonators within the metal-insulator-metal resonator face flow-through reaction space 1502 and may receive electromagnetic radiation from light-emitting diode array 1520 and promote decomposition of $H_2S$ through heat and electric field enhancement generated upon the metal-insulator-metal resonator. In addition, when the amount of solar radiation 1530 is high, the metal-insulator-metal resonator may be heated through absorption of solar radiation 1530, and as a consequence of Kirchoff's law of thermal radiation, the absorbed heat may be converted to electromagnetic radiation by the metal-insulator-metal resonator and supplied to flow-through reaction space 1502. Thus, solar radiation 1530 in the broadband can be utilized to promote formation of narrow-band electromagnetic radiation around the resonant frequency of the metal-insulator-metal resonator without relying solely on light-emitting diode array 1520.

Accordingly, in some embodiments, the at least one metamaterial-catalyst surface may be present upon a substrate that is opaque to solar radiation or is blocked from transmitting solar radiation to the plurality of resonators, such that the solar radiation is converted to heat and heating of the flow-through reaction space takes place when exposure to solar radiation occurs. The substrate may be the surface of a solar heat absorber or a separate substrate in thermal contact with a solar heat absorber, for example. In another example, the substrate may be present as a portion of a metal-insulator-metal resonator.

Figure 17:
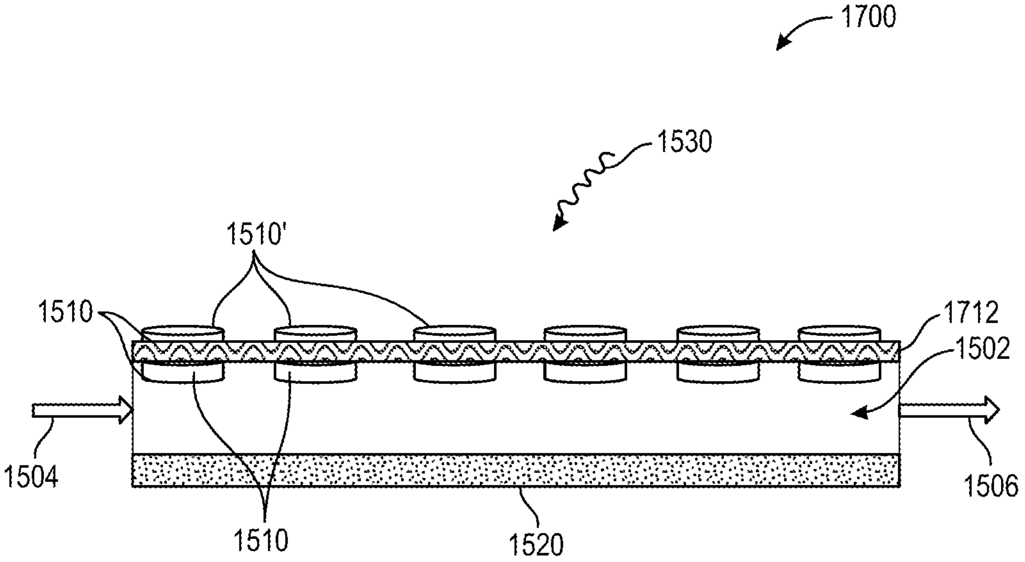
FIG. 17 is a cross-sectional diagram of an illustrative photoreactor system containing a flow-through reaction space configured to receive heat from solar radiation that interacts with plurality of resonators not associated with photocatalyst particles.

FIG. 17 is a cross-sectional diagram of illustrative photoreactor system 1700 containing a flow-through reaction space configured to receive heat from solar radiation that interacts with plurality of resonators not associated with photocatalyst particles. Photoreactor system 1700 is similar to photoreactor systems 1500 and 1600, except for modifications discussed hereinafter, and common reference characters will be used to designate features of photoreactor system 1700 having a similar structure and function to corresponding structures in photoreactor systems 1500 and 1600. Like photoreactor system 1600, heat produced from solar radiation 1530 may be transferred to flow-through reaction space 1502 to promote a photocatalytic reaction of hydrogen sulfide therein, albeit it in a different manner. In photoreactor system 1700, substrate 1712 may be either transparent or non-transparent to solar radiation 1530. Preferably, substrate 1712 is transparent to solar radiation 1530 to promote the photocatalytic reaction under promotion of both solar radiation 1530 and electromagnetic radiation received from light-emitting diode array 1520. Like photoreactor systems 1500 and 1600, resonators 1510 are located upon a face of substrate 1712 defining a boundary of flow-through reaction space 1502. A second plurality of resonators 1510' are located upon the face of substrate 1712 opposite the face upon which resonators 1510 (first plurality of resonators 1510) are disposed. That is, second plurality of resonators 1510' may be located upon or within and external surface of substrate 1712. Whereas resonators 1510 have a plurality of photocatalyst particles in proximity thereto, resonators 1510' do not. Resonators 1510' may be configured to absorb at least a portion of solar radiation 1530 incident thereon (optionally, a portion of solar radiation 1530 passes to resonators 1510), such that solar radiation 1530 is converted to heat and the heat is at least partially transferred to flow-through reaction space 1502. The heat transferred to flow-through-reaction space 1502, in combination with electromagnetic radiation provided by light-emitting diode array 1520, may promote a photocatalytic conversion of hydrogen sulfide in accordance with the disclosure herein.

Although resonators 1510 and 1510' are shown as being of a similar size, shape, and pattern in FIG. 17, it is to be appreciated that the depicted configuration is illustrative, and resonators 1510 and 1510' may differ in size, shape, and patterning. For example, resonators 1510 may be configured to interact with electromagnetic radiation emitted from light-emitting diode array 1520 (a narrow-band source) whereas resonators 1510' may be configured to interact with electromagnetic radiation emitted from a solar source (e.g., solar source 1530) or other broadband source. Optionally, resonators 1510' may be configured to permit passage of electromagnetic radiation having a wavelength with which resonators 1510 may effectively interact.

Accordingly, in some embodiments, the at least one metamaterial-catalyst surface may be present upon a first face of a substrate and a second plurality of resonators are located upon a second face of the substrate opposite the first face, the second plurality of resonators being capable of interacting with solar radiation, such that the solar radiation is converted to heat by the second plurality of resonators and heating of the flow-through reaction space takes place when exposure to solar radiation occurs. As indicated above, photocatalyst particles are not located in proximity to the second plurality of resonators so the solar radiation incident thereon may be converted to heat.

Figure 18A:
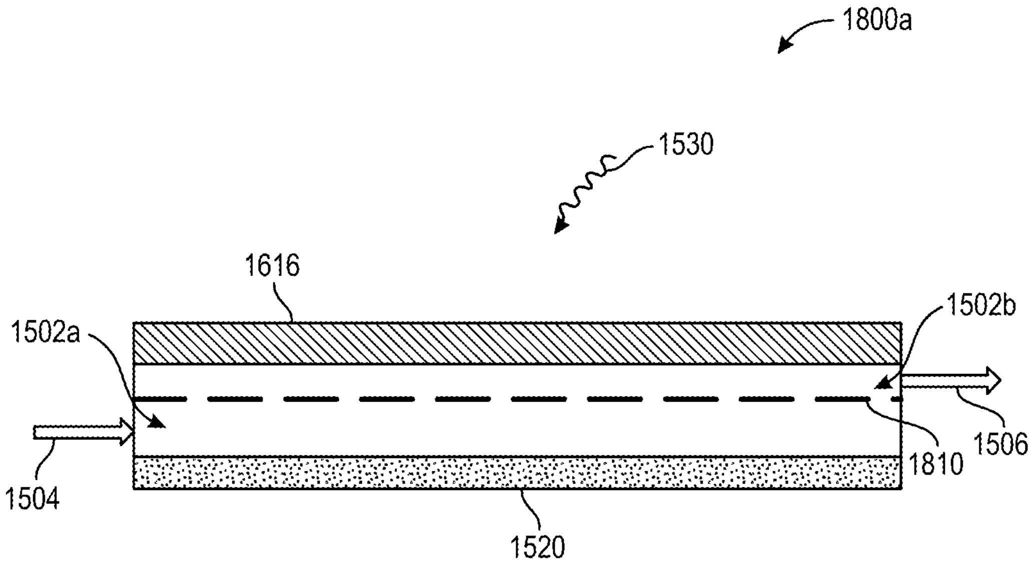
FIGS. 18A and 18B are cross-sectional diagrams of illustrative photoreactor systems containing a flow-through reaction space divided by a membrane resonator.
Figure 18B:
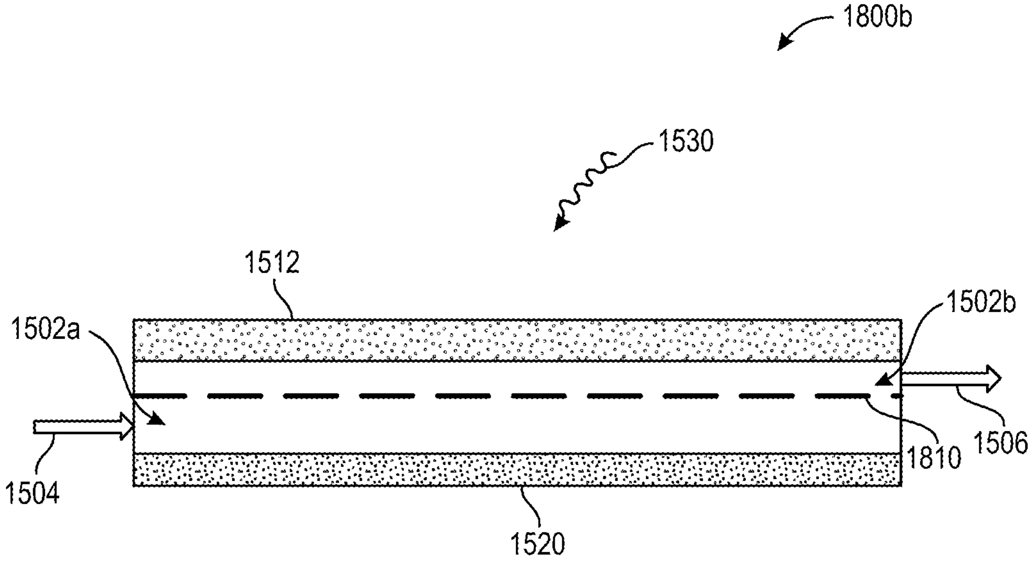

The substrate bearing a metamaterial-catalyst surface may be configured as a membrane resonator in some examples. FIGS. 18A and 18B are cross-sectional diagrams of illustrative photoreactor systems **1800*a* and 1800*b*, each containing a flow-through reaction space divided by a membrane resonator. Photoreactor systems 1800*a* and 1800*b* are similar to photoreactor systems 1500, 1600, and 1700, except for modifications discussed hereinafter, and common reference characters will be used to designate features of photoreactor systems 1800*a* and 1800*b* having a similar structure and function to corresponding structures in photoreactor systems 1500, 1600, and 1700. Photoreactor system 1800*a* (FIG. 18A) contains a flow-through reaction space divided into flow-through reaction spaces 1502*a* and 1502*b* by membrane resonator 1810. Membrane resonator 1810 may be similar to nano-hole (or nano-slit) array membrane resonator 1300 (FIG. 13) and may be better understood by reference thereto. Gas inlet 1504 is connected to flow-through reaction space 1502*a*, which is bounded by light-emitting diode array 1520 and membrane resonator 1810. A reactant (e.g., $H_2S$) entering flow-through reaction space 1502*a* may undergo photocatalytic conversion therein and the gaseous reaction product (e.g., molecular hydrogen) may pass through membrane resonator 1810 into flow-through reaction space 1502. Flow-through reaction space 1502*b* is bounded by solar heat absorber 1616 and membrane resonator 1810. Solar heat absorber 1616 may be a black-painted metal plate or similar type of highly absorbing structure. Although the resonators in membrane resonator 1810 are blocked from receiving solar radiation 1530 in photoreactor system 1800*a*, the solar radiation absorbed by solar heat absorber 1616 may be converted to heat, such that the heat may be at least partially transferred to flow-through reaction spaces 1502*a* and 1502*b*. The reaction product may then exit flow-through reaction space 1502*b* of photoreactor system 1800*a* via fluid outlet 1506. The heat introduced to flow-through reaction spaces 1502*a* and 1502*b* may further facilitate the photocatalytic reaction taking place therein, as well as facilitate maintaining sulfur in a liquid state for ready passage through flow-through reaction spaces 1502*a* and 1502*b***.

Photoreactor system **1800*b* (FIG. 18B) is identical to photoreactor system 1800*a* (FIG. 18A), except solar heat absorber 1616 is replaced by substrate 1512 that is at least partially transparent to solar radiation 1530. Thus, in photoreactor system 1800***b*, flow-through reaction space 1502*b* is bounded by substrate 1512 and membrane resonator 1810, such that solar radiation 1530 may be received in flow-through reaction space 1502*b*. Accordingly, a photocatalytic reaction may take place in either or both of flow-through reaction spaces 1502*a* or 1502*b*. In some examples, a first photocatalytic reaction may take place in flow-through reaction space 1502*a* and a second photocatalytic reaction may take place in flow-through reaction space 1502*b*. An induced pressure differential between the flow-through reaction spaces 1502*a* and 1502*b* may force a reactant to traverse membrane resonator 1810 to facilitate conversion thereof under promotion of the metamaterial-catalyst surface of membrane resonator 1810.

Accordingly, in some embodiments, the at least one metamaterial-catalyst surface may be present upon a metamaterial membrane comprising a substrate having a plurality of holes or slits defined therein, such that the metamaterial membrane divides the flow-through reaction space into a first flow-through reaction space and a second flow-through reaction space.

Figure 19:
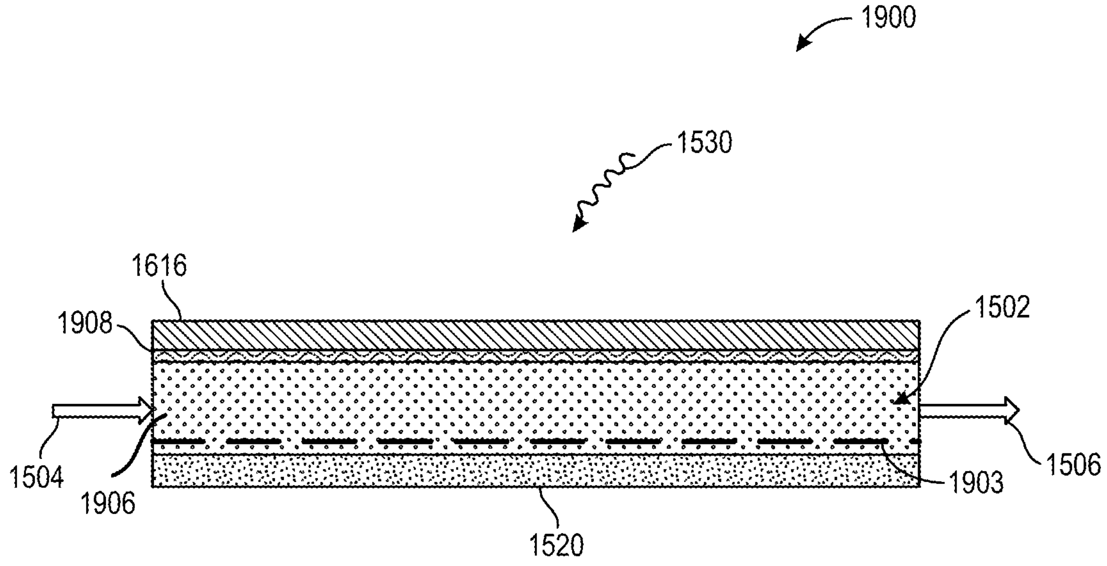
FIG. 19 is a cross-sectional diagram of an illustrative photoreactor system having a flow-through reaction space defined within a metal-insulator-metal resonator.

FIG. 19 is a cross-sectional diagram of an illustrative photoreactor system having a flow-through reaction space defined within a metal-insulator-metal resonator. Photoreactor system 1900 is similar to photoreactor systems 1500, 1600, and 1700 except for modifications discussed hereinafter, and common reference characters will be used to designate features of photoreactor system 1900 having a similar structure and function to corresponding structures in photoreactor systems 1500, 1600, and 1700. In photoreactor system 1900, a metal-insulator-metal resonator (FIGS. 12A and 12B) is interposed between solar heat absorber 1616 and light-emitting diode array 1520. The metal-insulator-metal resonator comprises resonators 1903 upon or within porous dielectric material 1906. Porous dielectric material 1906 is disposed upon metal backing layer 1908. Metal backing layer 1908, in turn, abuts solar heat absorber 1616. Flow-through reaction space 1502 is defined within at least a portion of porous dielectric material 1906. Gas inlet 1504 and gas outlet 1506 extend from flow-through reaction space 1502 to allow passage of a feedstream (e.g., a hydrogen sulfide-containing gas or liquid) therethrough. Resonators 1903 receive electromagnetic radiation from light-emitting diode array 1520, and the energy is transferred to the photocatalyst in the form of heat or electric field energy. Additional heat energy input may be received from solar heat absorber 1616 to further facilitate the photocatalytic reaction taking place in flow-through reaction space 1502.

The foregoing reactor systems may be arranged in a layered configuration, with the substrate and artificial source being substantially planar (e.g., a flat panel), such that the flow-through reaction space is linearly interposed between the artificial source (e.g., a light-emitting diode array) and a second boundary. Alternately, the substrate and the artificial source may be substantially non-planar, such as a tubular or cylindrical configuration, in which case the flow-through reaction space or a portion thereof may reside along the central axis of the tubular or cylindrical configuration or define an annulus between the substrate and the artificial source.

Figure 20:
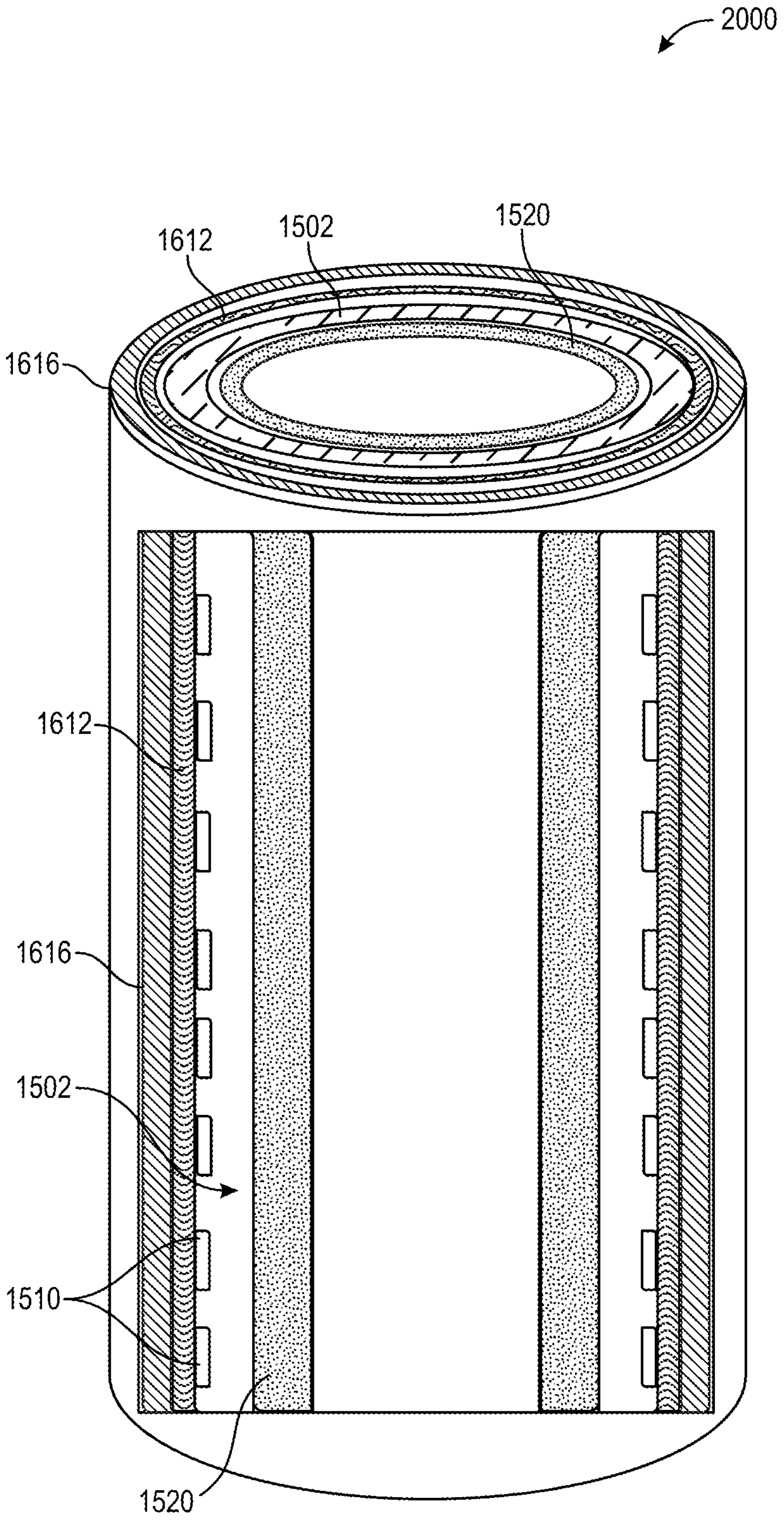
FIG. 20 is a cut-away cross-sectional diagram of an illustrative photoreactor system in which a flow-through reaction space is defined as an annulus.

FIG. 20 is a cut-away cross-sectional diagram of illustrative photoreactor system 2000 in which a flow-through reaction space is defined as an annulus. Photoreactor system 2000 is configured as a cylinder in FIG. 20, but it is to be appreciated that other geometric shapes providing an annular flow-through reaction space are possible. Moreover, it is to be appreciated that any of photoreactor systems 1500, 1600, 1700, 1800*a*, 1800*b*, or 1900 (FIG. 15, 16, 17, 18A, 18B, or 19) or variations thereof may be modified into a cylindrical configuration having flow-through reaction space 1502 defined as an annulus. Photoreactor system 2000 depicts photoreactor system 1600 of FIG. 16 re-arranged into a cylindrical shape. As such, common reference characters are used between these two figures. It is to be appreciated that photoreactor systems 1500, 1700, 1800A, 1800B, or 1900 may be similarly re-arranged. In the interest of brevity, such reconfigured photoreactor systems are not shown or described further herein.

Methods of the present disclosure may comprise: providing at least one metamaterial-catalyst surface within a reaction space, in which the at least one metamaterial-catalyst surface comprises a metamaterial surface having a plurality of resonators located thereon and a plurality of photocatalyst particles located upon at least a portion of the resonators, within a gap between a first region and a second region of one or more of the resonators, or within a gap between adjacent resonators; exposing the at least one metamaterial-catalyst surface to electromagnetic radiation while interacting the at least one metamaterial-catalyst surface to a feed mixture comprising hydrogen sulfide; and obtaining elemental hydrogen and elemental sulfur after interacting the feed mixture with the at least one metamaterial-catalyst surface. The plurality of photocatalyst particles comprise at least one photocatalyst effective to convert hydrogen sulfide into elemental hydrogen and elemental sulfur upon exposure to electromagnetic radiation. Preferably, the feed mixture may comprise a gas phase comprising hydrogen sulfide. More preferably, the feed mixture may comprise a gas stream comprising hydrogen sulfide, such that the photocatalytic reaction occurring within the reaction space takes place in a flow-through manner. Alternately, the photocatalytic reaction taking place in the reaction space may occur under batch conditions.

Therefore, in more specific embodiments, methods of the present disclosure may comprise: providing a gas stream comprising hydrogen sulfide; interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators; exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface. The plurality of photocatalyst particles may comprise at least one photocatalyst effective to convert hydrogen sulfide into elemental hydrogen and elemental sulfur upon exposure to electromagnetic radiation. The electromagnetic radiation may be received by the metamaterial-catalyst surface in accordance with the disclosure provided herein.

In some embodiments, the photocatalyst particles may not initially be associated with the at least one metamaterial-catalyst surface and may instead be formed in situ by providing the photocatalyst particles with a feed stream comprising hydrogen sulfide. The feed stream may comprise a gas stream or a liquid stream. By co-flowing the photocatalyst particles with the hydrogen sulfide, the at least one metamaterial-catalyst surface may form transiently as the photocatalyst particles interact with the resonators, promote the photocatalytic conversion of hydrogen sulfide into elemental hydrogen and elemental sulfur, and then pass from the flow-through reaction space. The photocatalyst particles may then be recirculated to the flow-through reaction space with additional feed stream. Such methods may comprise: providing a feed stream comprising hydrogen sulfide; interacting the feed stream in a flow-through reaction space with at least one metamaterial surface comprising a plurality of resonators patterned thereon; exposing the at least one metamaterial surface to a plurality of photocatalyst particles while interacting the feed stream with the at least one metamaterial surface; exposing the at least one metamaterial surface to electromagnetic radiation while interacting the at least one metamaterial surface with the feed stream; and obtaining elemental hydrogen and elemental sulfur after interacting the feed stream with the at least one metamaterial surface. The plurality of photocatalyst particles may comprise at least one photocatalyst effective to convert hydrogen sulfide into elemental hydrogen and elemental sulfur upon exposure to electromagnetic radiation. The electromagnetic radiation may be received by the metamaterial surface in accordance with the disclosure provided herein.

Embodiments disclosed herein include:

A. Photoreactor systems. The photoreactor systems comprise: a flow-through reaction space having at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators; wherein the plurality of photocatalyst particles comprise at least one photocatalyst effective to convert hydrogen sulfide into elemental hydrogen and elemental sulfur upon exposure to electromagnetic radiation.

B. Gas-phase photocatalyst methods. The methods comprise: providing a gas stream comprising hydrogen sulfide; interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators; wherein the plurality of photocatalyst particles comprise at least one photocatalyst effective to convert hydrogen sulfide into elemental hydrogen and elemental sulfur upon exposure to electromagnetic radiation; exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface.

C. Photocatalyst methods. The methods comprise: providing a feed stream comprising hydrogen sulfide; interacting the feed stream in a flow-through reaction space with at least one metamaterial surface comprising a plurality of resonators patterned thereon; exposing the at least one metamaterial surface to a plurality of photocatalyst particles while interacting the feed stream with the at least one metamaterial surface; wherein the plurality of photocatalyst particles comprise at least one photocatalyst effective to convert hydrogen sulfide into elemental hydrogen and elemental sulfur upon exposure to electromagnetic radiation; exposing the at least one metamaterial surface to electromagnetic radiation while interacting the at least one metamaterial surface with the feed stream; and obtaining elemental hydrogen and elemental sulfur after interacting the feed stream with the at least one metamaterial surface.

Each of embodiments A-C may have one or more of the following additional elements in any combination:

Element 1: wherein the flow-through reaction space is connected to a gas inlet for receiving a gas stream comprising hydrogen sulfide, a gas outlet for discharging elemental hydrogen, and a liquid outlet for discharging elemental sulfur.

Element 2: wherein the at least one metamaterial-catalyst surface receives electromagnetic radiation from a solar source, an artificial source, or any combination thereof.

Element 3: wherein the at least one metamaterial-catalyst surface receives electromagnetic radiation from at least an artificial source.

Element 4: wherein the artificial source is located adjacent to the flow-through reaction space.

Element 5: wherein the artificial source comprises a light-emitting diode array.

Element 6: wherein the at least one metamaterial-catalyst surface is present upon a substrate that is at least partially transparent to solar radiation, such that the at least one metamaterial-catalyst surface receives a first input of electromagnetic radiation as solar radiation from a first face of the substrate and a second input of electromagnetic radiation from the artificial source.

Element 7: wherein the at least one metamaterial-catalyst surface is present upon a substrate that is opaque to solar radiation or is blocked from transmitting solar radiation to the plurality of resonators, such that the solar radiation is converted to heat and heating of the flow-through reaction space takes place when exposure to solar radiation occurs.

Element 8: wherein the at least one metamaterial-catalyst surface is present upon a first face of a substrate and a second plurality of resonators are located upon a second face of the substrate opposite the first face, the second plurality of resonators being capable of interacting with solar radiation, such that the solar radiation is converted to heat by the second plurality of resonators and heating of the flow-through reaction space takes place when exposure to solar radiation occurs.

Element 9: wherein the at least one metamaterial-catalyst surface is present upon a membrane resonator comprising a substrate having plurality of holes or slits defined therein, the membrane resonator dividing the flow-through reaction space into a first flow-through reaction space and a second flow-through reaction space.

Element 10: wherein the artificial source is also present.

Element 11: wherein the substrate is substantially planar, and the flow-through reaction space or a portion thereof is linearly interposed between the substrate and the artificial source.

Element 12: wherein the substrate and artificial source are non-planar, and the flow-through reaction space or a portion thereof defines an annulus between the substrate and the artificial source.

Element 13: wherein the plurality of resonators comprise one or more of a split ring resonator, a dimer gap resonator, a Fano resonator, a metal-insulator-metal resonator, a nanohole array resonator, or any combination thereof.

Element 14: wherein the electromagnetic radiation comprises ultraviolet electromagnetic radiation, visible electromagnetic radiation, infrared electromagnetic radiation, or any combination thereof.

Element 15: wherein the electromagnetic radiation is received from a solar source, an artificial source, or any combination thereof.

Element 16: wherein the electromagnetic radiation is received from at least an artificial source.

Element 17: wherein the at least one metamaterial-catalyst surface is interacted with the gas stream at a temperature ranging from about 135° C. to about 155° C.

Element 18: wherein feed stream comprises a gas stream or a liquid stream.

Element 19: wherein the plurality of photocatalyst particles is introduced to the flow-through reaction space concurrently with the feed stream.

By way of non-limiting example, exemplary combinations applicable to A include, but are not limited to: 1 and 2; 1 and 3; 1-3; 1, 3, and 4; 1-4; 1-5; 1, 3, 4, and 5; 1-3, and 5; 1, 2, and 6; 1, 2, and 7; 1, 2, and 8; 1, 2, and 9; 2 and 3; 2-4; 2-5; 2 and 6; 2 and 7; 2 and 8; 2 and 9; 3 and 4; 3-5; 3, 4, and 6; 3-6; 3, 4, and 7; 3, 4, and 8; and 3, 4, and 9.

By way of further non-limiting example, exemplary combinations applicable to B and C include, but are not limited to: 14 and 15; 14 and 16; 14 and 17; 5, 14, and 15; 5, 14, and 16; and 5, 14, and 17.

The present disclosure is further directed to the following non-limiting clauses:

Clause 1. A photoreactor system comprising:

a flow-through reaction space having at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation.

Clause 2. The photoreactor system of clause 1, wherein the flow-through reaction space is connected to a gas inlet for receiving a gas stream comprising hydrogen sulfide, a gas outlet for discharging elemental hydrogen, and a liquid outlet for discharging elemental sulfur.

Clause 3. The photoreactor system of clause 1 or clause 2, wherein the at least one metamaterial-catalyst surface receives electromagnetic radiation from a solar source, an artificial source, or any combination thereof.

Clause 4. The photoreactor system of clause 3, wherein the at least one metamaterial-catalyst surface receives electromagnetic radiation from at least an artificial source.

Clause 5. The photoreactor system of clause 4, wherein the artificial source is located adjacent to the flow-through reaction space.

Clause 6. The photoreactor system of any one of clauses 3-5, wherein the artificial source comprises a light-emitting diode array.

Clause 7. The photoreactor system of any one of clauses 3-6, wherein the at least one metamaterial-catalyst surface is present upon a substrate that is at least partially transparent to solar radiation, such that the at least one metamaterial-catalyst surface receives a first input of electromagnetic radiation as solar radiation from a first face of the substrate and a second input of electromagnetic radiation from the artificial source.

Clause 8. The photoreactor system of any one of clauses 3-6, wherein the at least one metamaterial-catalyst surface is present upon a substrate that is opaque to solar radiation or is blocked from transmitting solar radiation to the plurality of resonators, such that the solar radiation is converted to heat and heating of the flow-through reaction space takes place when exposure to solar radiation occurs.

Clause 9. The photoreactor system of any one of clauses 3-6, wherein the at least one metamaterial-catalyst surface is present upon a first face of a substrate and a second plurality of resonators are located upon a second face of the substrate opposite the first face, the second plurality of resonators being capable of interacting with solar radiation, such that the solar radiation is converted to heat by the second plurality of resonators and heating of the flow-through reaction space takes place when exposure to solar radiation occurs.

Clause 10. The photoreactor system of any one of clauses 3-6, wherein the at least one metamaterial-catalyst surface is present upon a membrane resonator comprising a substrate having plurality of holes or slits defined therein, the membrane resonator dividing the flow-through reaction space into a first flow-through reaction space and a second flow-through reaction space.

Clause 11. The photoreactor system of any one of clauses 7-10, wherein the artificial source is also present.

Clause 12. The photoreactor system of clause 11, wherein the artificial source comprises a light-emitting diode array.

Clause 13. The photoreactor system of clause 11 or clause 12, wherein the substrate is substantially planar, and the flow-through reaction space or a portion thereof is linearly interposed between the substrate and the artificial source.

Clause 14. The photoreactor system of clause 11 or clause 12, wherein the substrate and artificial source are non-planar, and the flow-through reaction space or a portion thereof defines an annulus between the substrate and the artificial source.

Clause 15. The photoreactor system of any preceding clause, wherein the plurality of resonators comprise one or more of a split ring resonator, a dimer gap resonator, a Fano resonator, a metal-insulator-metal resonator, a nano-hole array resonator, or any combination thereof.

Clause 16. A method comprising:

providing a gas stream comprising hydrogen sulfide;

interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface.

Clause 17. The method of clause 16, wherein the electromagnetic radiation comprises ultraviolet electromagnetic radiation, visible electromagnetic radiation, infrared electromagnetic radiation, or any combination thereof.

Clause 18. The method of clause 16 or clause 17, wherein the electromagnetic radiation is received from a solar source, an artificial source, or any combination thereof.

Clause 19. The method of any one of clauses 16-18, wherein the electromagnetic radiation is received from at least an artificial source.

Clause 20. The method of clause 18 or clause 19, wherein the artificial source is a light emitting diode array.

Clause 21. The method of any one of clauses 16-20, wherein the at least one metamaterial-catalyst surface is interacted with the gas stream at a temperature ranging from about 135° C. to about 155° C.

Clause 22. A method comprising:

providing a feed stream comprising hydrogen sulfide;

interacting the feed stream in a flow-through reaction space with at least one metamaterial surface comprising a plurality of resonators patterned thereon;

exposing the at least one metamaterial surface to a plurality of photocatalyst particles while interacting the feed stream with the at least one metamaterial surface;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial surface to electromagnetic radiation while interacting the at least one metamaterial surface with the feed stream; and obtaining elemental hydrogen and elemental sulfur after interacting the feed stream with the at least one metamaterial surface.

Clause 23. The method of clause 22, wherein feed stream comprises a gas stream or a liquid stream.

Clause 24. The method of clause 22 or clause 23, wherein the plurality of photocatalyst particles is introduced to the flow-through reaction space concurrently with the feed stream.

Clause 25. The method of any one of clauses 22-24, wherein the at least one metamaterial surface receives electromagnetic radiation from a solar source, an artificial source, or any combination thereof.

Clause 26. The method of clause 25, wherein the at least one metamaterial surface receives electromagnetic radiation from at least one artificial source.

Clause 27. The method of clause 26, wherein the at least one artificial source is located adjacent to the flow-through reaction space.

Clause 1A. A photoreactor system comprising:

a flow-through reaction space having at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation.

Clause 2A. The photoreactor system of clause 1A, wherein the flow-through reaction space is connected to a gas inlet for receiving a gas stream comprising hydrogen sulfide, a gas outlet for discharging elemental hydrogen, and a liquid outlet for discharging elemental sulfur.

Clause 3A. The photoreactor system of clause 1A, wherein the at least one metamaterial-catalyst surface receives electromagnetic radiation from a solar source, an artificial source, or any combination thereof.

Clause 4A. The photoreactor system of clause 3A, wherein the artificial source is present and located adjacent to the flow-through reaction space.

Clause 5A. The photoreactor system of clause 4A, wherein the artificial source comprises a light-emitting diode array.

Clause 6A. The photoreactor system of clause 4A, wherein the at least one metamaterial-catalyst surface is present upon a substrate that is at least partially transparent to solar radiation, such that the at least one metamaterial-catalyst surface receives a first input of electromagnetic radiation as solar radiation from a first face of the substrate and a second input of electromagnetic radiation from the artificial source.

Clause 7A. The photoreactor system of clause 4A, wherein the at least one metamaterial-catalyst surface is present upon a substrate that is opaque to solar radiation or is blocked from transmitting solar radiation to the plurality of resonators, such that the solar radiation is converted to heat and heating of the flow-through reaction space takes place when exposure to solar radiation occurs.

Clause 8A. The photoreactor system of clause 4A, wherein the at least one metamaterial-catalyst surface is present upon a first face of a substrate and a second plurality of resonators are located upon a second face of the substrate opposite the first face, the second plurality of resonators being capable of interacting with solar radiation, such that the solar radiation is converted to heat by the second plurality of resonators and heating of the flow-through reaction space takes place when exposure to solar radiation occurs.

Clause 9A. The photoreactor system of clause 4A, wherein the at least one metamaterial-catalyst surface is present upon a membrane resonator comprising a substrate having plurality of holes or slits defined therein, the membrane resonator dividing the flow-through reaction space into a first flow-through reaction space and a second flow-through reaction space.

Clause 10A. The photoreactor system of clause 4A, wherein the plurality of resonators are located upon a substrate that is substantially planar, and the flow-through reaction space or a portion thereof is linearly interposed between the substrate and the artificial source.

Clause 11A. The photoreactor system of clause 4A, wherein the plurality of resonators are located upon a substrate that is substantially non-planar and the artificial source is also substantially non-planar, and the flow-through reaction space or a portion thereof defines an annulus between the substrate and the artificial source.

Clause 12A. The photoreactor system of clause 1A, wherein the plurality of resonators comprise one or more of a split ring resonator, a dimer gap resonator, a Fano resonator, a metal-insulator-metal resonator, a nano-hole array resonator, or any combination thereof.

Clause 13A. A method comprising:

providing a gas stream comprising hydrogen sulfide;

interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface.

Clause 14A. The method of clause 13A, wherein the electromagnetic radiation comprises ultraviolet electromagnetic radiation, visible electromagnetic radiation, infrared electromagnetic radiation, or any combination thereof.

Clause 15A. The method of clause 13A, wherein the electromagnetic radiation is received from a solar source, an artificial source, or any combination thereof.

Clause 16A. The method of clause 15A, wherein the artificial source is present and located adjacent to the flow-through reaction pathway, and at least a portion of the electromagnetic radiation is received from the artificial source.

Clause 17A. The method of clause 16A, wherein the artificial source is a light emitting diode array.

Clause 18A. The method of clause 13A, wherein the at least one metamaterial-catalyst surface is interacted with the gas stream at a temperature ranging from about 135° C. to about 155° C.

Clause 19A. A method comprising:

providing a feed stream comprising hydrogen sulfide;

interacting the feed stream in a flow-through reaction space with at least one metamaterial surface comprising a plurality of resonators patterned thereon;

exposing the at least one metamaterial surface to a plurality of photocatalyst particles while interacting the feed stream with the at least one metamaterial surface;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial surface to electromagnetic radiation while interacting the at least one metamaterial surface with the feed stream; and obtaining elemental hydrogen and elemental sulfur after interacting the feed stream with the at least one metamaterial surface.

Clause 20A. The method of clause 19A, wherein the feed stream comprises a gas stream or a liquid stream.

Clause 21A. The method of clause 20A, wherein the plurality of photocatalyst particles is introduced to the flow-through reaction space concurrently with the feed stream.

Clause 22A. The method of clause 19A, wherein the at least one metamaterial surface receives electromagnetic radiation from a solar source, an artificial source, or any combination thereof.

Clause 23A. The method of clause 22A, wherein the artificial source is present and located adjacent to the flow-through reaction pathway, and at least a portion of the electromagnetic radiation is received from the artificial source.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A photoreactor system comprising:

a flow-through reaction space having at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation.

2. The photoreactor system of claim 1, wherein the flow-through reaction space is connected to a gas inlet for receiving a gas stream comprising hydrogen sulfide, a gas outlet for discharging elemental hydrogen, and a liquid outlet for discharging elemental sulfur.

3. The photoreactor system of claim 1, wherein the at least one metamaterial-catalyst surface receives electromagnetic radiation from a solar source, an artificial source, or any combination thereof.

4. The photoreactor system of claim 3, wherein the artificial source is present and located adjacent to the flow-through reaction space.

5. The photoreactor system of claim 4, wherein the artificial source comprises a light-emitting diode array.

6. The photoreactor system of claim 4, wherein the at least one metamaterial-catalyst surface is present upon a substrate that is at least partially transparent to solar radiation, such that the at least one metamaterial-catalyst surface receives a first input of electromagnetic radiation as solar radiation from a first face of the substrate and a second input of electromagnetic radiation from the artificial source.

7. The photoreactor system of claim 4, wherein the at least one metamaterial-catalyst surface is present upon a substrate that is opaque to solar radiation or is blocked from transmitting solar radiation to the plurality of resonators, such that the solar radiation is converted to heat and heating of the flow-through reaction space takes place when exposure to solar radiation occurs.

8. The photoreactor system of claim 4, wherein the at least one metamaterial-catalyst surface is present upon a first face of a substrate and a second plurality of resonators are located upon a second face of the substrate opposite the first face, the second plurality of resonators being capable of interacting with solar radiation, such that the solar radiation is converted to heat by the second plurality of resonators and heating of the flow-through reaction space takes place when exposure to solar radiation occurs.

9. The photoreactor system of claim 4, wherein the at least one metamaterial-catalyst surface is present upon a membrane resonator comprising a substrate having plurality of holes or slits defined therein, the membrane resonator dividing the flow-through reaction space into a first flow-through reaction space and a second flow-through reaction space.

10. The photoreactor system of claim 4, wherein the plurality of resonators are located upon a substrate that is substantially planar, and the flow-through reaction space or a portion thereof is linearly interposed between the substrate and the artificial source.

11. The photoreactor system of claim 4, wherein the plurality of resonators are located upon a substrate that is substantially non-planar and the artificial source is also substantially non-planar, and the flow-through reaction space or a portion thereof defines an annulus between the substrate and the artificial source.

12. The photoreactor system of claim 1, wherein the plurality of resonators comprise one or more of a split ring resonator, a dimer gap resonator, a Fano resonator, a metal-insulator-metal resonator, a nano-hole array resonator, or any combination thereof.

13. A method comprising:

providing a gas stream comprising hydrogen sulfide;

interacting the gas stream in a flow-through reaction space with at least one metamaterial-catalyst surface, the at least one metamaterial-catalyst surface comprising a metamaterial surface having a plurality of resonators patterned thereon and a plurality of photocatalyst particles located upon at least a portion of the resonators, within a gap between a first region and a second region of one or more resonators, or within a gap between adjacent resonators;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial-catalyst surface to electromagnetic radiation while interacting the at least one metamaterial-catalyst surface with the gas stream; and obtaining elemental hydrogen and elemental sulfur after interacting the gas stream with the at least one metamaterial-catalyst surface.

14. The method of claim 13, wherein the electromagnetic radiation comprises ultraviolet electromagnetic radiation, visible electromagnetic radiation, infrared electromagnetic radiation, or any combination thereof.

15. The method of claim 13, wherein the electromagnetic radiation is received from a solar source, an artificial source, or any combination thereof.

16. The method of claim 15, wherein the artificial source is present and located adjacent to the flow-through reaction pathway, and at least a portion of the electromagnetic radiation is received from the artificial source.

17. The method of claim 16, wherein the artificial source is a light emitting diode array.

18. The method of claim 13, wherein the at least one metamaterial-catalyst surface is interacted with the gas stream at a temperature ranging from about 135° C. to about 155° C.

19. A method comprising:

providing a feed stream comprising hydrogen sulfide;

interacting the feed stream in a flow-through reaction space with at least one metamaterial surface comprising a plurality of resonators patterned thereon;

exposing the at least one metamaterial surface to a plurality of photocatalyst particles while interacting the feed stream with the at least one metamaterial surface;

wherein the plurality of photocatalyst particles comprise at least one photocatalyst effective to convert hydrogen sulfide into elemental hydrogen and elemental sulfur upon exposure to electromagnetic radiation;

exposing the at least one metamaterial surface to electromagnetic radiation while interacting the at least one metamaterial surface with the feed stream; and obtaining elemental hydrogen and elemental sulfur after interacting the feed stream with the at least one metamaterial surface.

20. The method of claim 19, wherein the feed stream comprises a gas stream or a liquid stream.

21. The method of claim 20, wherein the plurality of photocatalyst particles is introduced to the flow-through reaction space concurrently with the feed stream.

22. The method of claim 19, wherein the at least one metamaterial surface receives electromagnetic radiation from a solar source, an artificial source, or any combination thereof.

23. The method of claim 22, wherein the artificial source is present and located adjacent to the flow-through reaction pathway, and at least a portion of the electromagnetic radiation is received from the artificial source.

* * * * *